US 8,581,457 B2

(12) United States Patent
Takahashi et al.

(10) Patent No.: US 8,581,457 B2
(45) Date of Patent: Nov. 12, 2013

(54) WHEEL SUPPORT BEARING ASSEMBLY WITH SENSOR AND IN-WHEEL MOTOR INTEGRATION

(75) Inventors: Toru Takahashi, Iwata (JP); Kiyotake Shibata, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/480,915

(22) Filed: May 25, 2012

(65) Prior Publication Data

US 2012/0229004 A1 Sep. 13, 2012

Related U.S. Application Data

(63) Continuation of application No. PCT/JP2010/070436, filed on Nov. 17, 2010.

(30) Foreign Application Priority Data

Nov. 27, 2009 (JP) .................................. 2009-269690
Sep. 30, 2010 (JP) .................................. 2010-220793

(51) Int. Cl.
  *H02K 7/00* (2006.01)
  *H02K 7/14* (2006.01)
  *H02K 11/00* (2006.01)
(52) U.S. Cl.
  CPC ........................................ *H02K 7/14* (2013.01)
  USPC ... 310/67 R; 310/68 B; 310/68 R; 73/115.07; 301/6.5; 180/65.51
(58) Field of Classification Search
  CPC ............. H02K 7/14; H02K 7/00; H02K 11/00
  USPC .................. 310/67 R, 68 B, 68 R; 73/115.07; 301/6.5; 180/65.51
  See application file for complete search history.

(56) References Cited

U.S. PATENT DOCUMENTS 4,996,882 A * 3/1991 Kistler ............................ 73/777
5,014,800 A * 5/1991 Kawamoto et al. ........ 180/65.51
(Continued)

FOREIGN PATENT DOCUMENTS

JP 2007-331447 12/2007
JP 2008-68725 3/2008
(Continued)

OTHER PUBLICATIONS

International Preliminary Report on Patentability mailed Jul. 19, 2012 issued in corresponding International Patent Application No. PCT/JP2010/070436.

(Continued)

*Primary Examiner* — John K Kim

(57) ABSTRACT

A wheel support bearing assembly with sensor and in-wheel motor integration, that can sense with improved accuracy the forces acting on a contact point between a wheel and a road for precise control of an electric motor unit and/or a vehicle. The bearing assembly includes a bearing unit that rotatably supports a hub of a drive wheel, an electric motor unit, and a reduction gear unit between the electric motor unit and the bearing unit. A sensor unit is associated with an outer ring of the bearing unit. The sensor unit includes a strain generator and at least one measuring sensor attached to the strain generator. The strain generator includes a thin plate including at least two fixation contact segments fixed in contact with an outer diameter surface of the outer ring.

11 Claims, 16 Drawing Sheets

(56) References Cited

U.S. PATENT DOCUMENTS

| | | | |
|---|---|---|---|
| 5,287,851 A * | 2/1994 | Beran et al. | 128/204.23 |
| 7,530,416 B2 * | 5/2009 | Suzuki | 180/65.51 |
| 7,538,281 B2 * | 5/2009 | Pottebaum et al. | 177/211 |
| 8,307,931 B2 * | 11/2012 | Akamatsu | 180/65.51 |
| 2008/0169141 A1 | 7/2008 | Suzuki | |
| 2009/0236157 A1 * | 9/2009 | Akamatsu | 180/55 |
| 2009/0301221 A1 * | 12/2009 | Andersson et al. | 73/862.041 |
| 2010/0303394 A1 * | 12/2010 | Isobe et al. | 384/448 |
| 2012/0229004 A1 * | 9/2012 | Takahashi et al. | 310/67 R |
| 2012/0330490 A1 * | 12/2012 | Ozaki et al. | 701/22 |

FOREIGN PATENT DOCUMENTS

| | | |
|---|---|---|
| JP | 2008-74135 | 4/2008 |
| JP | 2008-74136 | 4/2008 |
| JP | 2008-81089 | 4/2008 |
| JP | 2008-172935 | 7/2008 |
| JP | 2009-128264 | 6/2009 |
| WO | WO 2007/010843 | 1/2007 |

OTHER PUBLICATIONS

International Search Report of Corresponding PCT Application PCT/JP2010/070436 mailed Feb. 22, 2011.

U.S. Appl. No. 12/734,826, filed May 26, 2010, Hiroshi Isobe et al, NTN Corporation.

U.S. Appl. No. 12/311,109, filed Mar. 19, 2009, Yoshinobu Akamatsu, NTN Corporation.

* cited by examiner

OUTBOARD SIDE ← → INBOARD SIDE (A)

(B)

(C)

WHEEL SUPPORT BEARING ASSEMBLY WITH SENSOR AND IN-WHEEL MOTOR INTEGRATION

CROSS REFERENCE TO THE RELATED APPLICATIONS

This application is a continuation application, under 35 U.S.C. §111(a), of international application No. PCT/JP2010/070436, filed Nov. 17, 2010, which claims priority to Japanese patent applications No. 2009-269690, filed Nov. 27, 2009, and No. 2010-220793, filed Sep. 30, 2010, the entire disclosures of which are herein incorporated by reference as a part of this application.

BACKGROUND OF THE INVENTION

1. Field of the Invention

The present invention relates to a wheel support bearing assembly with sensor and in-wheel motor integration, in which a sensor that senses forces acting on a contact point between a drive wheel and a road surface is integrated into a wheel support bearing assembly of in-wheel motor type which includes a combination of a bearing unit, a reduction gear unit and an electric motor unit.

2. Description of Related Art

For driving stability control of an electric automotive vehicle equipped with a wheel support bearing assembly of in-wheel motor type that includes a combination of a bearing unit, a reduction gear unit, an electric motor unit and a brake unit, a technique has been proposed which uses a sensor to measure the forces along three axes perpendicular to each other, that act on a contact point between a drive wheel and a road surface. The measurements are based on the status of at least one of the following elements: the bearing unit; the electric motor unit; the reduction gear unit; and the brake unit (see Patent Document 1 listed below).

PRIOR ART LITERATURE

[Patent Document 1] JP Laid-open Patent Publication No. 2008-074135
[Patent Document 2] JP Laid-open Patent Publication No. 2009-128264

A wheel support bearing assembly of in-wheel motor type disclosed in Patent Document 1 includes a bearing unit and a load sensor associated with a stationary raceway member of the bearing unit to sense the respective forces that act along three axes. The sensitivity of the load sensor employed in this assembly, with which the respective loads acting along the three axes are sensed, leaves room for improvement. In particular, a load sensor employed in a wheel support bearing assembly of in-wheel motor type where a bearing unit is coupled via a reduction gear unit to an electric motor unit, is more susceptible to drifts in output signals, since the bearing unit is subject to the heat generated by the electric motor unit and the reduction gear unit. This results in more sensing errors and leads to load sensing with poor accuracy.

For application of load sensors in a wheel support bearing assembly, a sensor unit has been proposed which includes a strain generator including a thin plate and also includes a strain sensor on the thin plate (see Patent Document 2 listed above). Such a sensor unit has never been implemented in a wheel support bearing assembly of in-wheel motor type.

SUMMARY OF THE INVENTION

An object of the invention is to provide a wheel support bearing assembly with sensor and in-wheel motor integration, that can sense with improved accuracy the respective forces along three axes that act on a contact point between a drive wheel and a road surface and is therefore effective for precise control of an electric motor unit and/or a vehicle.

The present invention provides a wheel support bearing assembly with sensor and in-wheel motor integration. The assembly includes a bearing unit that rotatably supports a hub of a drive wheel. The bearing unit includes an outer ring that forms a stationary raceway member. The outer ring has an outer diameter surface. The assembly also includes an electric motor unit that forms a drive source to rotate the drive wheel as well as a reduction gear unit that is interposed between the electric motor unit and the bearing unit. The assembly further includes a sensor unit that includes a strain generator as well as at least one measuring sensor attached to the strain generator. The sensor unit is associated with the outer ring. The strain generator includes a thin plate that includes at least two fixation contact segments fixed in contact with the outer diameter surface of the outer ring.

In this construction, a sensor unit includes a strain generator as well as at least one measuring sensor attached to the strain generator, with the sensor unit being associated with the outer ring forming the stationary raceway member, and with the strain generator including a thin plate that includes at least two fixation contact segments fixed in contact with the outer diameter surface of the outer ring. This allows the sensor unit to sense with improved accuracy strain of the outer ring of the bearing unit, that may be caused by forces acting on a contact point between a drive wheel and a road surface. Therefore, a plurality of sensor outputs from the sensor unit can be used to computationally estimate with precision the loads along three axes that act on the contact point between the drive wheel and the road surface, that are effective for precise control of the electric motor unit and/or a vehicle.

In the present invention, the outer diameter surface of the outer ring may have upper, lower, right and left surface portions that correspond to upper and lower locations as well as right and left locations relative to a tire contact surface with a road, and the sensor unit may be associated with the outer ring at each of the upper, lower, right, and left surface portions.

Such arrangement of four sensor units allows for estimation with further precision of the respective loads along the three axes—that is, a vertical load Fz, a load Fx representing a drive force and/or a brake force, as well as an axial load Fy, acting on a contact point between a drive wheel and a road surface.

In the present invention, the sensor unit may include one sensor and two fixation contact segments.

In the present invention, the sensor unit may include two sensors and three fixation contact segments.

In the present invention, a plastic molding may be provided in proximity to where the sensor unit is disposed, that renders the sensor unit waterproof.

In the present invention, the sensor unit may be associated with the outer ring at an outboard side of the outer diameter surface and a cover may be provided that protects the outboard side of the outer diameter surface.

In the present invention, a signal processor unit may be associated with the outer ring of the bearing unit, a casing of the reduction gear unit, or a casing of the electric motor unit, with the signal processor unit including loads estimator circuitry that estimates loads acting on the drive wheel based on sensor output signals from the sensor unit.

In this construction, the wheel support bearing assembly includes a signal processor unit with which sensor output signals from the sensor unit can be processed to generate loads data for external output. This eliminates the need to transmit weak sensor output signals via a cable to the outside of the wheel support bearing assembly, thereby allowing for a simplified configuration of an electromagnetic shield for such a cable.

In the above construction, the signal processor unit may be associated with a stationary member other than the outer ring of the bearing unit, with the outer ring of the bearing unit including a flange for mounting the outer ring to the casing of the reduction gear unit, the flange having a hole formed therein, and a sensor cable being drawn out of the hole and wired to the signal processor unit for transmission of the output signals from the sensor unit to the signal processor unit.

Where the flange has a hole formed therein and a sensor cable is drawn out of the hole, the casing of the reduction gear unit may have a groove formed therein through which the sensor cable passes. In this case, the sensor cable drawn out of the hole formed in the flange may pass through the groove formed in the casing of the reduction gear unit, to connect to the signal processor unit. A waterproof seal may surround a sensor cable drawn out of the hole. Such a sensor cable that passes through the groove formed in the casing allows for the provision of a waterproof seal having a long extension along the groove, thereby sealing the sensor cable over a longer length thereof than could be sealed when the sensor cable were radially drawn. In other words, more improved sealing effect can be achieved between a surface of the sensor cable and the waterproof seal. Also, the sensor cable can have a greater bending radius than is the case with when the sensor cable were radially drawn. Therefore, even a sensor cable with thick coatings can be wired with ease. Also, the radial sticking-out of a sensor cable can be minimized.

In the present invention, the signal processor unit may at least include: a signal amplifier function to amplify the sensor output signals; a filter function to remove noise components from the sensor output signals; and an AD converter function to convert the sensor output signals from analog to digital.

In this configuration, the sensor output signals from the sensor unit can be converted to digital signals for load estimation and computed loads data can be output in the form of digital data. This minimizes the number of necessary wires, thereby reducing the cost of a cable employed. At the same time, the risk of breaking of wire can be reduced, thereby resulting in improved reliability.

In the present invention, the signal processor unit may further include a processor function that includes: a corrector function to correct the sensor output signals; an average value calculator function to calculate an average value of the sensor output signals; an amplitude value calculator function to calculate an amplitude value of the sensor output signals; and a memory function to store correction parameters for the correction, calculation parameters for the average value calculation and the amplitude value calculation, and calculation parameters that the loads estimator circuitry uses in computing equations where the average value and the amplitude value serve as variables. In this configuration, loads can be computed based on the average value of the sensor output signals and the amplitude value of the sensor output signals. In particular, since such an amplitude value can minimize the temperature-related effects, increase of load computing errors that may be caused by the heat generated by the electric motor unit and/or the reduction gear unit can be prevented, thereby improving the precision in load estimation. Also, with the signal processor unit including such a processor function, different adjustments of correction parameters and calculation parameters for different wheel support bearing assemblies can be made with ease.

In the present invention, a motor controller unit may be provided that controls the electric motor unit, with the motor controller unit including circuitry to which part of functions of the signal processor unit is integrated.

In this configuration, for instance, the same memory circuitry can be used to store therein the parameters necessary for total control of the electric motor unit as well as the respective parameters used by the signal processor unit. This allows for centralized management of information necessary for a wheel support bearing assembly.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the different figures, and:

DESCRIPTION OF THE PREFERRED EMBODIMENTS

FIG. 1 to FIG. 15 illustrate the first embodiment of the present invention. To begin with, the first embodiment will be described in general in connection with FIG. 1. The illustrated wheel support bearing assembly with sensor and in-wheel motor integration includes a bearing unit A that rotatably supports a hub of a drive wheel 70, an electric motor unit B forming a drive source for rotation, a reduction gear unit C that reduces the rotational speed of the electric motor unit B that is transmitted to the hub, and a brake unit D that applies a brake force to the hub, with these units A to D being arranged along the center axis O of the drive wheel 70. Note that the expression "arranged along a/the center axis O" used herein does not necessarily mean that respective components are all located along the center axis O, but rather means that respective components are all operatively positioned with respect to the center axis O. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 2:
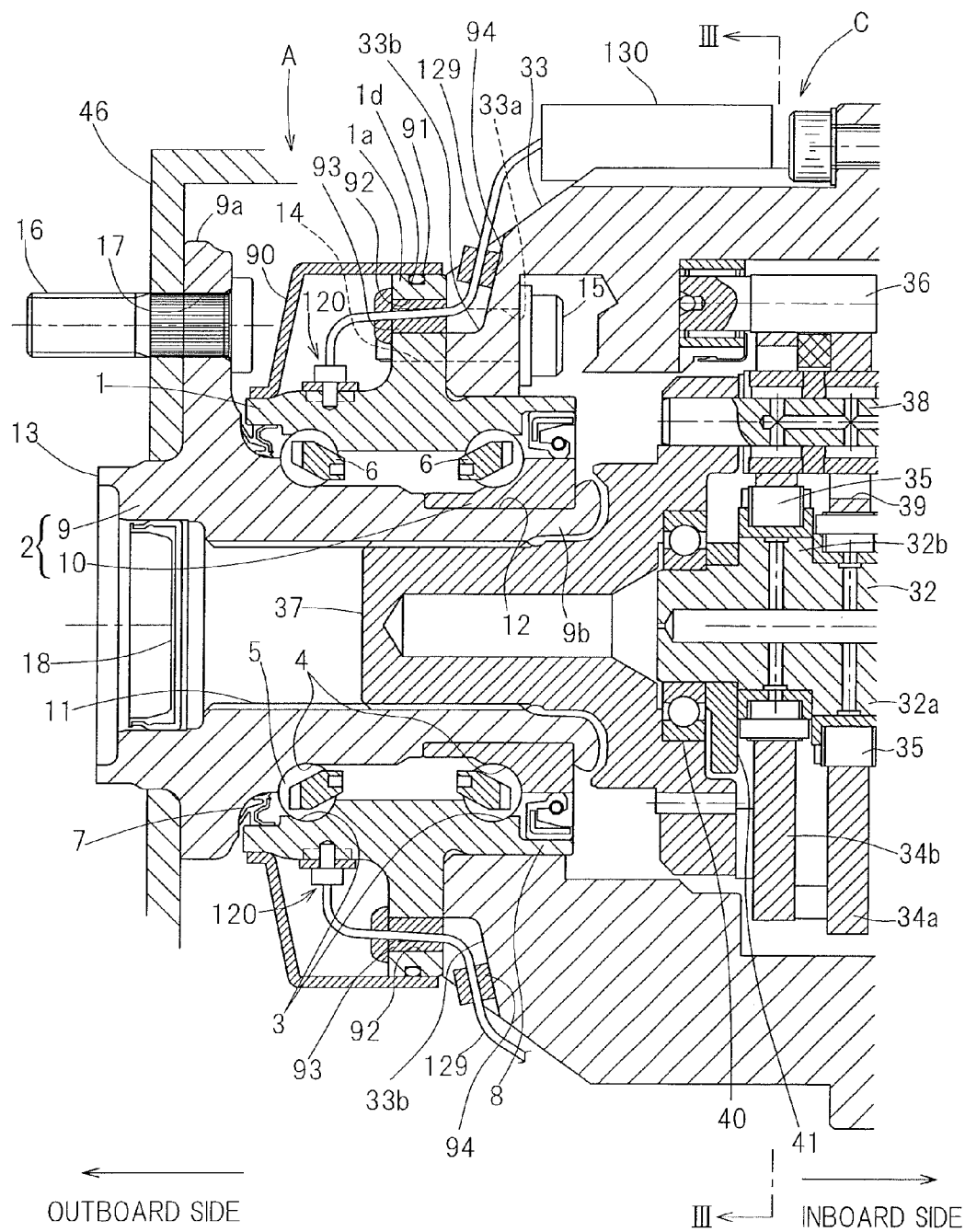
FIG. 2 shows a cross sectional view of a bearing unit and a reduction gear unit of the wheel support bearing assembly.

As shown in FIG. 2, the bearing unit A includes an outer ring 1 having an inner periphery formed with a plurality of rows of respective raceway surfaces 3, an inner member 2 having an outer periphery formed with a plurality of rows of respective raceway surfaces 4 that face the respective raceway surfaces 3, and a plurality of rows of respective rolling elements 5 interposed between the respective raceway surfaces 3, 4 of the outer ring 1 and the inner member 2. The bearing unit A forms a plural-row, angular contact ball bearing. As such, the rolling elements 5 are in the form of balls, with each row of the rolling elements 5 being retained by a retainer 6. Each of the raceway surfaces 3, 4 has an arcuate, cross sectional shape. The raceway surfaces 3, 4 are designed to form back-to-back arrangement with corresponding contact angles. The outer ring 1 and the inner member 2 define bearing space delimited therebetween that has outboard and inboard ends sealed by seals 7, 8, respectively.

The outer ring 1 forms a stationary raceway member. The outer ring 1 is of one-piece construction that includes an outer periphery including a flange 1a for mounting to a casing 33 of the reduction gear unit C. The flange 1a includes a plurality of circumferential locations formed with respective screw holes 14. With attachment bolts 15 being inserted in bolt insertion holes 33a of the casing 33 and being screwed in the screw holes 14, the outer ring 1 can be attached to the casing 33.

The inner member 2 forms a rotational raceway member. The inner member 2 includes a hub axle 9 and an inner ring 10. The hub axle 9 includes a hub flange 9a for mounting to the drive wheel 70 shown in FIG. 1 and to a brake ring 46. The hub axle 9 also includes an axle portion 9b that includes an inboard end having an outer periphery to which the inner ring 10 is mounted. The rows of the raceway surfaces 4 are formed on the hub axle 9 and the inner ring 10, respectively. Note that the hub axle 9 corresponds to a "hub" recited in the claims.

The hub axle 9 includes an inboard end that has an outer periphery formed with a stepped segment—stepped to have a smaller diameter to which the inner ring 10 is mounted—thereby forming an inner ring mount surface 12. The hub axle 9 includes a center having a through bore 11 formed therein. The hub flange 9a includes a plurality of circumferential locations formed with respective force-fit holes 17 for hub bolts 16. The hub axle 9 includes a cylindrical pilot portion 13 that guides the drive wheel 70 shown in FIG. 1 and the brake ring 46. The pilot portion 13 protrudes towards an outboard side from the proximity of a root portion of the hub flange 9a. The pilot portion 13 includes an inner periphery to which a cap 18 is fitted that closes an outboard end of the through bore 11.

Figure 1:
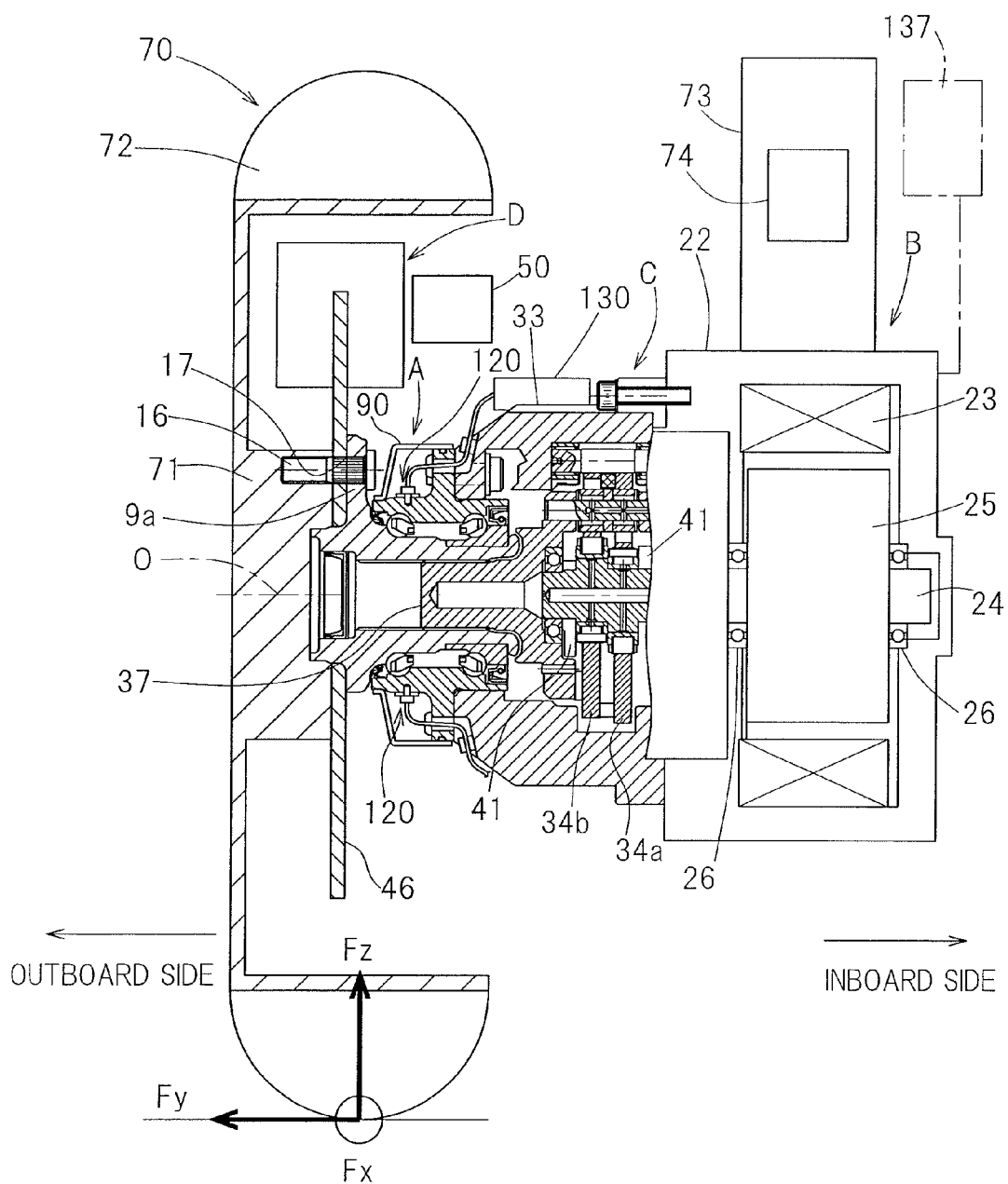
FIG. 1 shows a schematic view of a wheel support bearing assembly with sensor and in-wheel motor integration according to the first embodiment of the invention.

As shown in FIG. 1, the electric motor unit B is of a radial gap type that includes a stator 23 fixed to a tubular casing 22 and a rotor 25 associated with an output shaft 24, in which a radial gap is provided between the stator 23 and the rotor 25. The output shaft 24 is supported via two bearings 26 by the casing 22. The electric motor unit B is controlled by a motor controller unit 137 that includes control circuitry which, for example, includes inverters.

Figure 3:
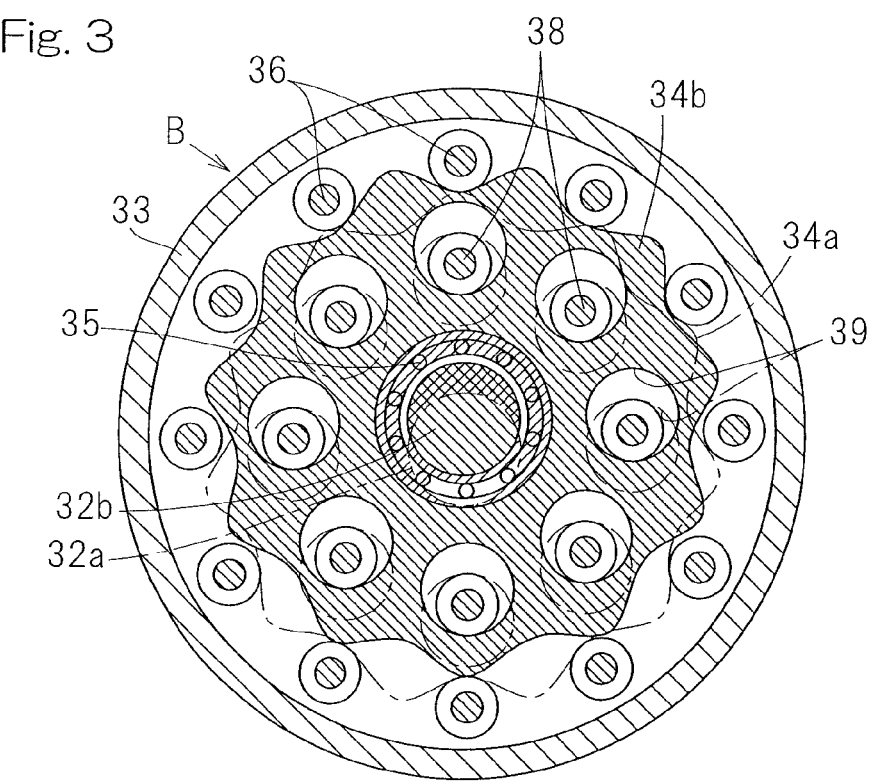
FIG. 3 shows a cross sectional view taken along the line III-III in FIG. 2.

As shown in FIG. 2 and FIG. 3, the reduction gear unit C includes a cycloidal reduction gear. Hence, the reduction gear unit C includes two curve plates 34a, 34b each having an outer shape that is defined by a smooth, wavy trochoidal curve, and the reduction gear unit C also includes an output shaft 32 including eccentric portions 32a, 32b to which the curve plates 34a, 34b, respectively, are mounted via respective bearings 35. The reduction gear unit C also includes a plurality of outer pins 36 that are extending between inboard and outboard side walls of the casing 33 and each guiding, at an outer periphery side thereof, the eccentric motions of the curve plates 34a, 34b. The reduction gear unit C further includes an output shaft 37 mounted by spline to the through bore 11 of the hub axle 9 for integral rotation, and also includes a plurality of inner pins 38 attached to the output shaft 37. The curve plates 34a, 34b include a plurality of through holes 39 formed therein to which the respective inner pins 38 are inserted. Note that the input shaft 32 is coupled by spline with the output shaft 24 of the electric motor unit B for integral rotation. Also note that the input shaft 32 has opposite ends supported via two respective bearings 40 by the casing 33 and an inner diameter surface of the output shaft 37, respectively. Preferably, a trochoidal curve that defines the outer shapes of the curve plates 34a, 34b is a cycloidal curve. However, such a trochoidal curve may be any other type of trochoidal curve. Note that the term "cycloidal reduction gear" used above encompasses such a trochoidal reduction gear as discussed above, in which a trochoidal curve defines the outer shapes.

Rotation of the output shaft 24 of the electric motor unit B shown in FIG. 1 causes eccentric motions of the respective curve plates 34a, 34b associated with the input shaft 32 that rotates integrally with the output shaft 24. The eccentric motions of the respective curve plates 34a, 34b are transmitted via the engagement between the inner pins 38 and the through holes 39, to the inner member 2 that includes a hub of a wheel, causing rotation of the inner member 2. The rotational speed of the inner member 2 is reduced with respect to that of the output shaft 24. For instance, a single stage cycloidal reduction gear can achieve a reduction ratio of no less than 1/10.

The two curve plates 34a, 34b are mounted to the respective eccentric portions 32a, 32b of the input shaft 32, 180° out of phase from each other so as to cancel out the mutual eccentric motions. The eccentric portion 32a includes a side to which a first counterweight 41 is mounted, and the eccentric portion 32b includes a side to which a second counterweight 41 is mounted, with these sides of the eccentric portions 32a, 32b being opposite to each other. The first counter weight 41 is offset in a direction opposite to the direction in which the eccentric portion 32a is offset, and the second counter weight 41 is offset in a direction opposite to the direction in which the eccentric portion 32b is offset, so as to cancel out the vibrations caused by the eccentric motions of the respective curve plates 34a, 34b.

Figure 4:
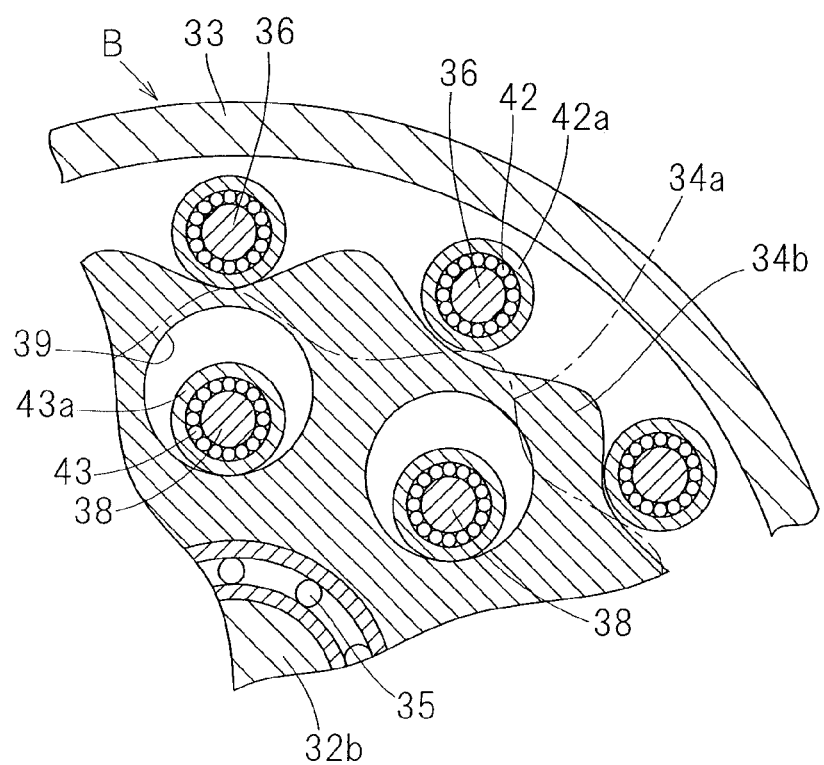
FIG. 4 shows an enlarged cross sectional view of a substantial portion from FIG. 3.

As shown in FIG. 4, the outer pins 36 and inner pins 38 include bearings 42, 43 mounted thereto, respectively. The outer rings 42a, 43a of the bearings 42, 43 rollingly contact the outer peripheries of the curve plates 34a, 34b and the inner peripheries of the through bores 39, respectively. This reduces the contact resistance between the outer pins 36 and the outer peripheries of the curve plates 34a, 34b as well as the contact resistance between the inner pins 38 and the inner peripheries of the through bores 39. As a result, the eccentric motions of the curve plates 34a, 34b can be smoothly transmitted to the inner member 2, causing rotation of the inner member 2.

Figure 5:
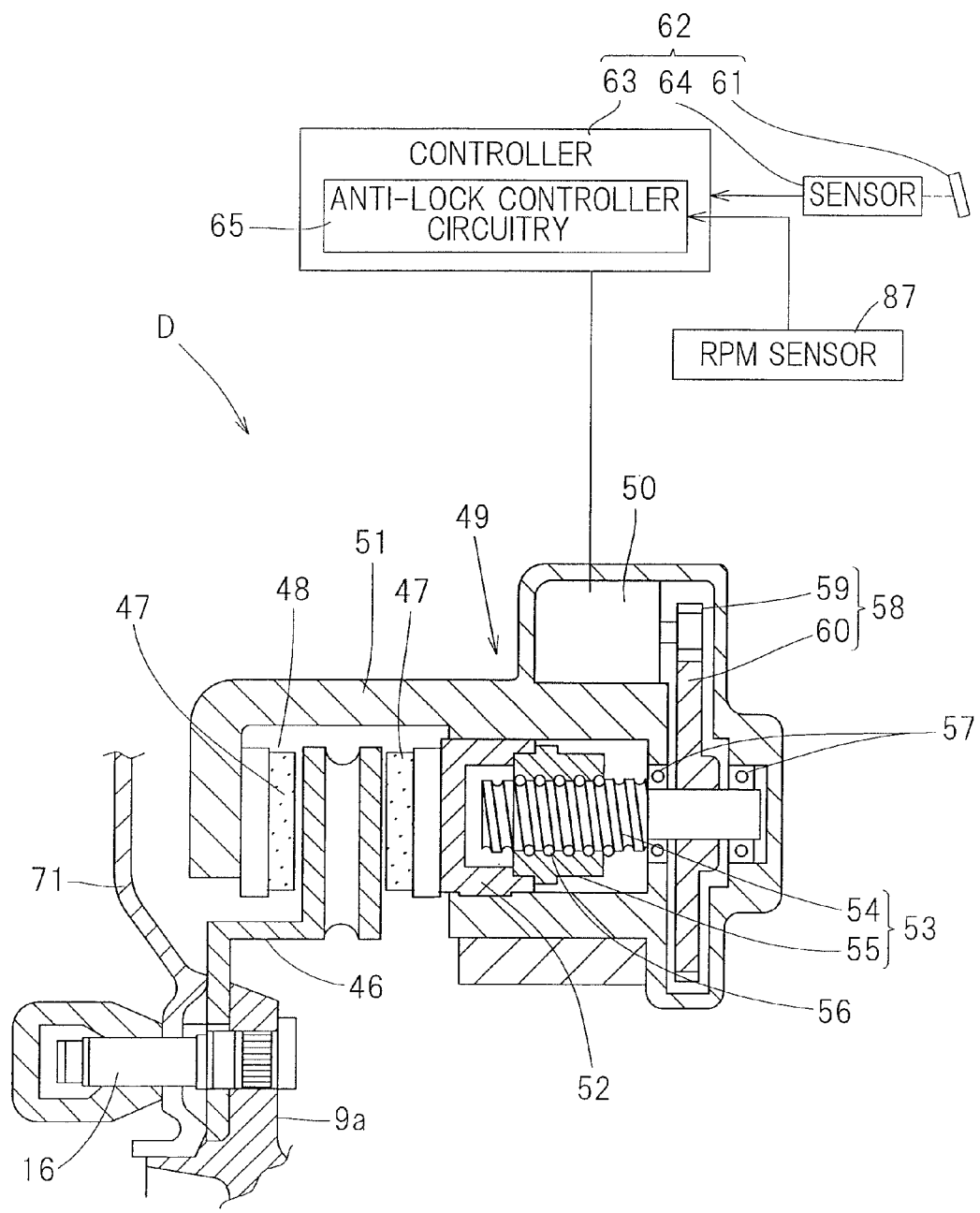
FIG. 5 shows a cross sectional view of a brake unit of the wheel support bearing assembly.

As shown in FIG. 5, the brake unit D includes a manipulator 48. The manipulator 48 includes a brake ring 46 that is attached to the hub flange 9a together with the drive wheel 70 and also includes brake pad(s) 47 that can frictionally contact the brake ring 46. The brake unit D also includes a drive 49 that actuates the brake pad(s) 47. The drive 49 forms an electric brake equipment that includes as a drive source an electric brake motor 50. The brake ring 46 includes a brake disc. A pair of brake pads 47 are positioned to sandwich the brake ring 46 therebetween. One of the brake pads 47 is fixed to a brake frame 51. The other of the brake pads 47 is attached to an advance/retraction member 52 that is associated with the brake frame 51 to be advanceable and retractable in a linear fashion. The advance/retraction member 52 confronts the brake ring 46 in a direction, in which the advance/retraction member 52 advances towards or retracts away from the brake ring 46. The advance/retraction member 52 is locked from rotation relative to the brake frame 51.

The drive 49 includes, in addition to the electric brake motor 50, a ball screw 53 that converts the rotational output of the electric motor 50 to a back-and-forth linear motion and transmits it to the brake pad(s) 47 as a brake force. The output of the electric motor 50 is transmitted to the ball screw 53 via a reduction gear and transmission mechanism 58. The ball screw 53 includes a screw shaft 54 and a nut 55. The screw shaft 54 is supported via bearings 57 by the brake frame 51 such that the screw shaft 54 can only rotate, and the nut 55 is fixed to the advance/retraction member 52. The advance/retraction member 52 and the nut 55 may be of one-piece construction.

The ball screw 53 includes, in addition to the screw shaft 54 and the nut 55, a plurality of balls 56 interposed between a first thread raceway formed in an outer peripheral surface of the screw shaft 54 and a second thread raceway in an inner peripheral surface of the nut 55, with the first and second thread raceways confronting each other. The nut 55 includes a circulation mechanism (not shown) including a continuous path that circulates the balls 56 placed between the screw shaft 54 and the nut 55, with the continuous path including no ends. The circulation mechanism may be of an external circulation type which includes a return tube and/or a guide plate. The circulation mechanism may be of an internal circulation mechanism which includes an end cap and/or a deflector. Since the ball screw 53 only makes back-and-forth motion over a short distance, the ball screw 53 may be of a type without the above circulation mechanism, for example, a retainer type which includes a retainer (not shown) that retinas a plurality of balls 56 placed between the screw shaft 54 and the nut 55.

The reduction gear and transmission mechanism 58 includes a train of gears and reduces the rotational speed of the electric brake motor 50 and transmits it to the screw shaft 54 of the ball screw 53. In the illustrated example, the reduction gear and transmission mechanism 58 includes a first gear 59 associated with an output shaft of the electric motor 50 and also includes a second gear 60 that is associated with the screw shaft 54 to mesh with the first gear 59. In another example (not shown), the reduction gear and transmission mechanism 58 may include, for example, a worm and a worm wheel.

The brake unit D includes an actuator 62 configured to control the electric motor 50 based on the actuation by an actuation member 61 such as a brake pedal. The actuator 62 includes anti-lock controller circuitry 65. The actuator 62 includes the aforementioned actuation member 61, a sensor 64 that can detect the amount as well as the direction of the actuation by the actuation member 61, and a controller 63 that controls the electric motor 50 according to the detection signals from the sensor 64. The controller 63 contains the aforementioned anti-lock controller circuitry 65. The controller 63 includes a motor control signal generator (not shown) that generates a motor control signal and also includes motor drive circuitry (not shown) that can control a motor current based on the motor control signal.

The anti-lock controller circuitry 65 adjusts, based on the rotation of the drive wheel 70 shown in FIG. 1, a brake force applied by the electric motor 50 to prevent locking-up of rotation of the drive wheel 70 during braking caused by the actuation of the actuation member 61. During braking, the anti-lock controller circuitry 65 determines the rotational speed of the drive wheel 70 shown in FIG. 1. When the anti-lock controller circuitry 65 detects, based on the rotational speed, locking-up of rotation of the drive wheel 70 shown in FIG. 1 or a sign thereof, the anti-lock controller circuitry 65 lowers the drive current to the electric motor 50 or causes the electric motor 50 to generate a temporary rotational output in the opposite direction. In this way, the anti-lock controller circuitry 65 adjusts the brake force, i.e. a clamp force applied by the brake pad(s) 47. The rotational speed of the drive wheel 70 is determined based on the output from an RPM sensor 87 that is associated with the electric motor unit B.

A shown in FIG. 1, to the hub flange 9a of the bearing unit A is attached the drive wheel 70 together with the brake ring 46. The drive wheel 70 includes a wheel 71 and a tire 72 mounted on a periphery of the wheel 71. With the brake ring 46 being sandwiched between the hub flange 9a and the wheel 71 and with the hub bolts 16 force-fitted in the force-fit holes 17 in the hub flange 9a being screwed to the wheel 71, the drive wheel 70 as well as the brake ring 46 can be secured to the hub flange 9a.

Figure 6:
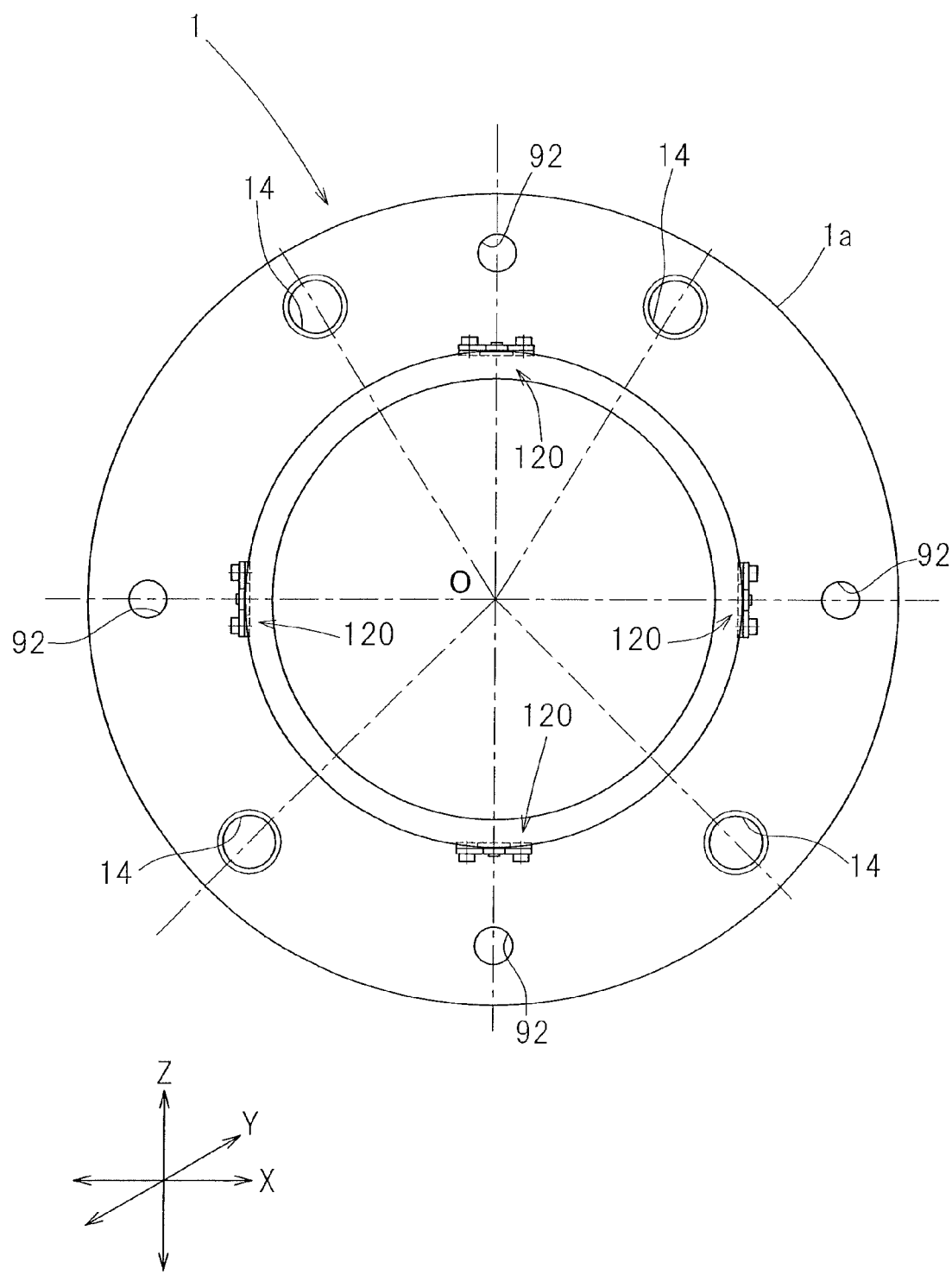
FIG. 6 shows a front elevational view of an outer member of a bearing unit of the wheel support bearing assembly, as viewed from an outboard side.

The outer ring 1, which forms the stationary raceway member, has an outer diameter surface, with which four sensor units 120 may be associated. FIG. 6 shows a front elevational view of the outer member 1 as viewed from an outboard side. In the figure, the sensor unit(s) 120 are associated with the outer ring 1 at upper, lower, right, and left surface portions thereof, respectively, that correspond to upper and lower locations as well as right and left locations relative to a tire contact surface with a road.

Figure 7:
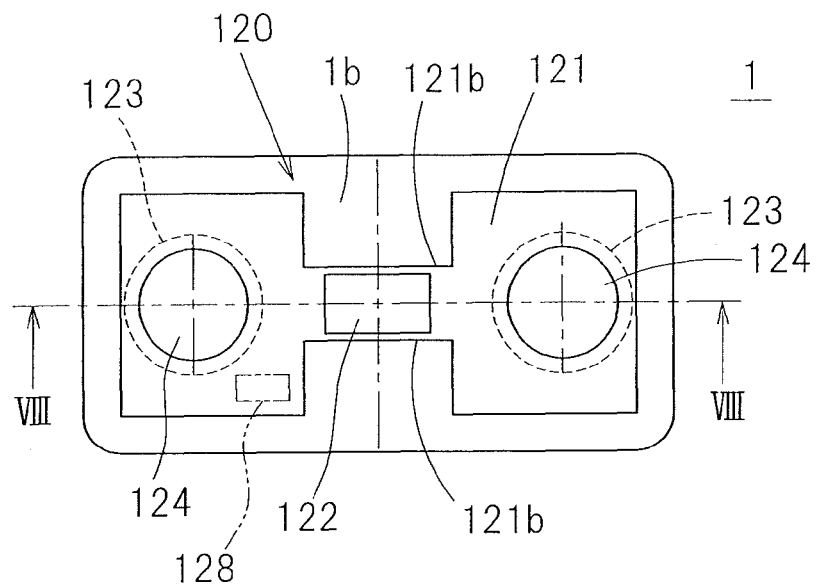
FIG. 7 shows an enlarged plan view of a sensor unit of the wheel support bearing assembly.
Figure 8:
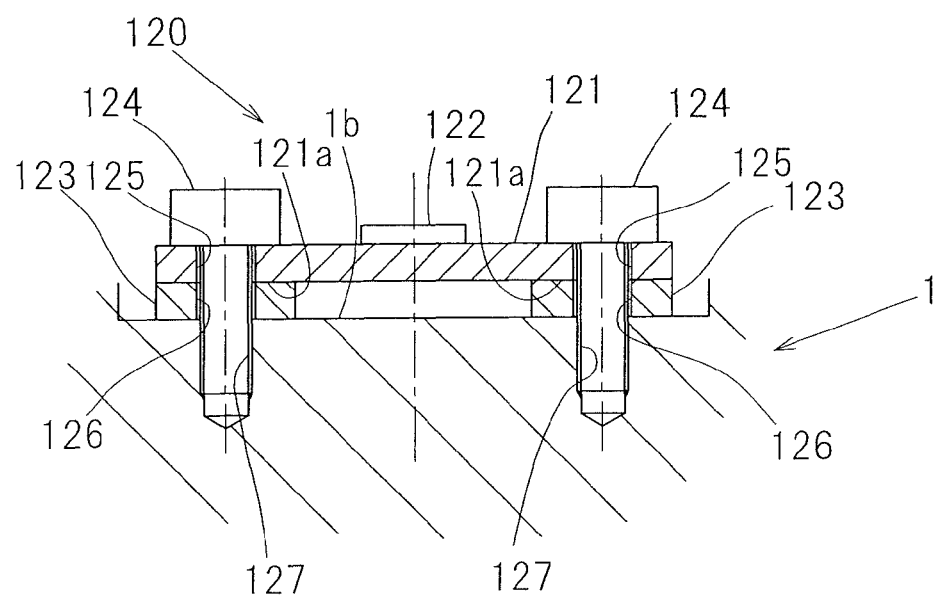
FIG. 8 shows a cross sectional view taken along the line VIII-VIII in FIG. 7.

As shown in the enlarged plan view of FIG. 7 and the enlarged cross sectional view of FIG. 8, each of the sensor unit(s) 120 includes a strain generator 121 and a strain sensor 122 attached to the strain generator 121 to sense strain of the strain generator 121. The strain generator 121 includes a metallic, elastically deformable thin plate such as a steel plate, having a thickness no greater than 3 mm. The thin plate is a substantially stripe-shaped as viewed in a plan view and has a width that is uniform over an entire length thereof. The thin plate includes a center with opposite side edges thereof having respective cutout(s) 121b. The strain generator 121 includes opposite ends thereof including two fixation contact segments 121a (FIG. 8) fixed, via respective spacers 123, in contact with the outer diameter surface of the outer ring 1. The strain sensor 122 is affixed on a portion of the strain generator 121 where higher strain is produced in response to loads along respective directions. In the figure, such a portion is a center of the strain generator 121 which is sandwiched, from outer surface sides thereof, by the cutout(s) 121b formed in the opposite side edges. And the strain sensor 122 senses circumferential strain that is produced near the cutout(s) 121b.

Preferably, the strain generator 121 does not plastically deform under a condition where the maximum possible force—the maximum possible external force that acts on the outer ring 1 which forms the stationary raceway member or the maximum possible force that acts between the tire and a road surface—affects the strain generator 121. This is because plastic deformation of the strain generator 121 leads to less transmission of deformation of the outer ring 1 to the sensor unit 120, thereby undesirably affecting the measurement of strain. The phrase "the maximum possible force" refers to an abnormally strong force of the maximum level that may be applied to the bearing unit A, but which is acceptable in the sense that the bearing unit A can recover, after removal of that force, a normal function as a bearing unit (assuming that recovery of the function of a sensor system is irrelevant, here).

Each of the sensor unit(s) 120 is associated with the outer ring 1 such that the two fixation contact segments 121a of that strain generator 121 are positioned at substantially the same axial coordinate of the outer ring 1 and also circumferentially spaced apart from each other. The fixation contact segments 121a are fixed, via respective spacers 123, by respective bolts 124 with the outer diameter surface of the outer ring 1. Each of the bolts 124 is inserted in a bolt insertion hole 125 radially perforated in the fixation contact segment 121a, and through a bolt insertion hole 126 formed in a spacer 123, to screw in a screw hole 127 formed in an outer periphery of the outer ring 1.

Such fixation of the fixation contact segments 121a to the outer diameter surface of the outer ring 1 via spacers 123 allows for a space to be formed between the outer diameter surface of the outer ring 1 and a center of the thin plate of the strain generator 121 where the cutout(s) 121b are formed. This facilitates deformation with strain near the cutout(s) 121b. Here, the axial coordinate at which the fixation contact segments 121a are located is an axial coordinate within the proximity of where an outboard raceway surface 3 of the outer ring 1 is located. The phrase "a/the proximity of where an outboard raceway surface 3 of the outer ring 1 is located" used herein refers to a range, as shown in FIG. 2, from where an outboard raceway surface 3 is formed to a mid-location between inboard and outboard raceway surfaces 3. The outer diameter surface of the outer ring 1 includes a flat portion 1b with which the spacers 123 fixedly contact.

Figure 9:
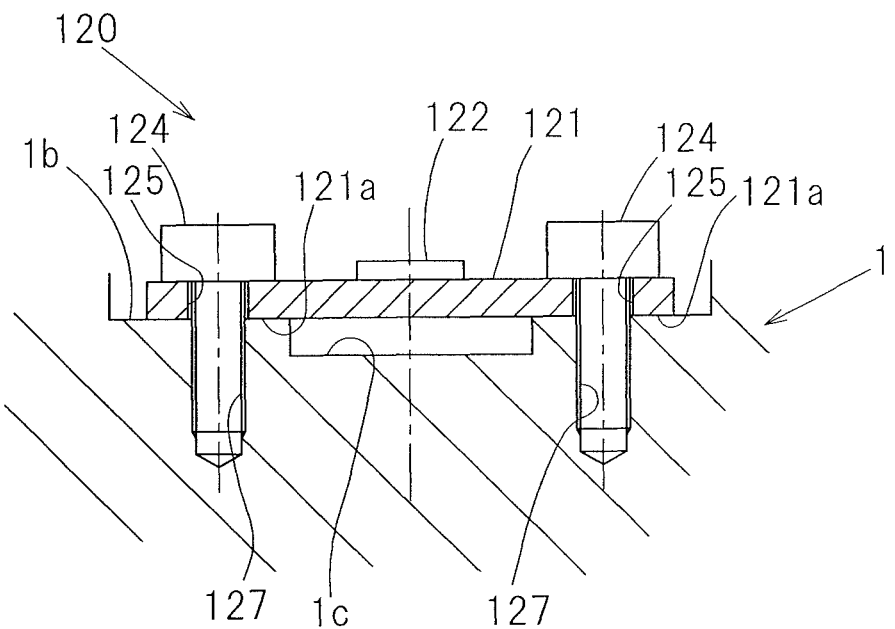
FIG. 9 shows a cross sectional view of another arrangement of the sensor unit.

In another example as shown in the cross sectional view of FIG. 9, the outer diameter surface of the outer member 1 has a groove 1c formed therein, at a mid-location of two portions of the outer diameter surface, with the two portions being where the two respective fixation contact segments 121a of the strain generator 121 are fixed. This also allows for a space to be formed, without the spacers 123, between the outer diameter surface of the outer ring 1 and a mid-location of the two fixation contact segments 121a, with the mid-location corresponding to where the cutout(s) 121b are formed in the strain generator 121.

Figure 10:
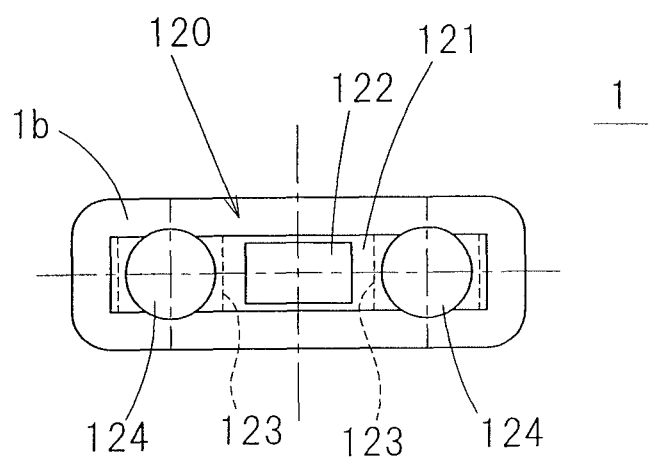
FIG. 10 shows an enlarged plan view of a sensor unit in another example.

In yet another example as shown in FIG. 10, the strain generator 121 may include a substantially stripe-shaped configuration as viewed in a plan view which does not include such cutout(s) 121b as in the example of FIG. 7.

A variety of strain sensors 122 may be used. For example, a strain sensor 122 includes a metallic foil strain gauge. In that case, the strain sensor 122 is adhesively fixed on a strain generator 121 in general.

Figure 11:
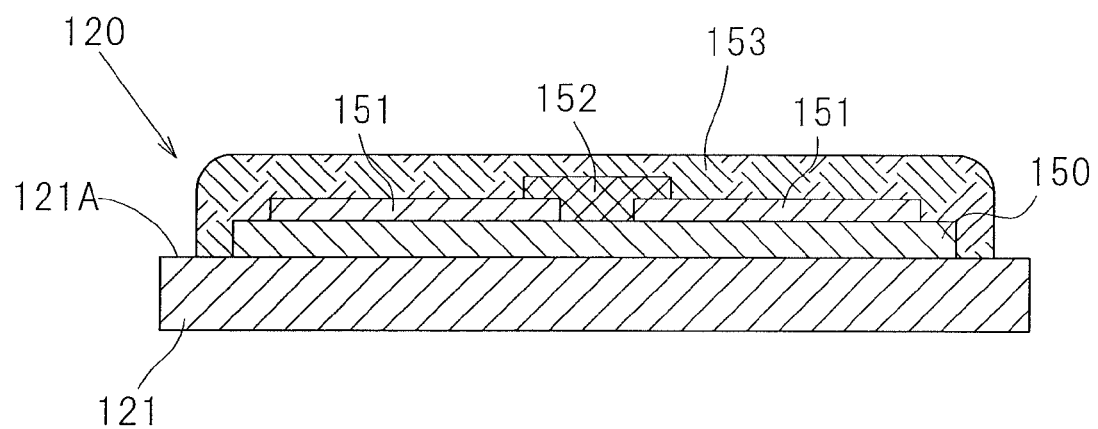
FIG. 11 shows an enlarged cross sectional view of a sensor unit in yet another example.

A strain sensor 122 may include a thick-film resistor formed on a strain generator 121. FIG. 11 shows such a construction of a sensor unit 120. The illustrated sensor unit 120 includes a strain generator 121, an insulation layer 150 formed on a sensor mount surface 121A of the strain generator 121, a pair of electrodes 151, 151 formed on the opposite sides of a surface of the insulation layer 150, a strain measurement resistor 152, which forms a strain sensor, on the insulation layer 150 between the electrodes 151, 151, and a protective film 153 formed on the electrodes 151, 151 as well as on the strain measurement resistor 152.

As shown in FIG. 2, the sensor unit(s) 120 associated with the outer ring 1 at the outer diameter surface thereof is/are covered by a protective cover 90. Note that the protective cover 90 is omitted in FIG. 6. The protective cover 90 is of a tubular configuration having an inner diameter that increases towards an inboard side. In particular, the protective cover 90 is of a cylindrical configuration with an inboard side having a larger diameter and with an outboard side, half of which shrinks towards an inner diameter side to have a smaller diameter. The protective cover 90 includes an inboard end mounted to an outer diameter surface of the flange 1a of the outer ring 1 via an O-ring 91. The protective cover 90 also includes an outboard end mounted to the outer diameter surface of the outer ring 1. A material for the protective cover 90 includes a metallic material such as a stainless steel and/or a resinous material such as PA66+GF. The flange 1a of the outer ring 1 includes the outer diameter surface including a circumferential groove 1d formed therein to which an O-ring can be fitted. With the O-ring 91 being fitted to the groove 1d, not only the O-ring 91 can be axially positioned but also the space between the inboard end of the protective cover 90 and the outer diameter surface of the flange 1a of the outer ring 1 can be reliably sealed. A proximity to where sensor unit(s) 120 is/are disposed is provided with a plastic molding that renders the sensor unit(s) 120 waterproof.

Such a protective cover 90 within which the sensor unit(s) 120 is/are fixedly associated with the outer ring 1 at the outer diameter surface thereof prevents corrosion, due to an external environment, of where the sensor unit(s) 120 is/are fixed, which may lead to instability of such fixations. As a result, the sensor unit(s) 120 can operate without any malfunctions, despite its/their use in the wheel support bearing assembly which operates where the suspension system thereof is subject to a severe environment.

Each of the sensor unit(s) 120 includes a signal cable (sensor cable) 129 that connects to a signal processor unit 130. The signal processor unit 130 includes loads estimator circuitry 133 (FIG. 12) that estimates loads acting on the drive wheel 70 based on sensor output signals from the respective sensor unit(s) 120. In the illustrated example, the signal processor unit 130 is associated with the casing 33 of the reduction gear unit C at an outboard end, outer diameter surface thereof. The signal processor unit 130 may be associated with the outer ring 1 at the outer diameter surface thereof along with the sensor unit(s) 120. The signal processor unit 130 may be associated with the casing 22 of the electric motor unit B at an outer diameter surface thereof.

A shown in FIG. 2, the flange 1a of the outer ring 1 has cable insertion hole(s) 92 that are axially perforated therein, out of which the signal cable(s) 129 of the respective sensor unit(s) 120 is/are drawn. The cable insertion hole(s) 92 is/are filled with an elastic filler 93 such as a molding plastic after the signal cable(s) 129 is/are drawn out of it/them. The signal cable(s) 129 out of the cable insertion hole(s) 92 pass(es) through respective cable guide cutout(s) 33b formed in an outboard end of the casing 33 of the reduction gear unit C and is/are drawn to the signal processor unit 130. A waterproof seal 94 surrounds the respective signal cable(s) 129 for waterproof thereof. The cutout(s) 33b may be through hole(s) open at an outer diameter surface of the casing 33. As such, penetration of, for example mud or salty water, from outside through the cable insertion hole(s) 92 into the protective cover 90 can be prevented. The wiring from the sensor unit(s) 120 to the signal processor unit 130 may be designed in such a way to extend inside the casing 33 of the reduction gear unit C. Thus, the signal cable(s) 129 may connect to the signal processor unit 130 without being exposed to the external environment. In this case, since the signal cable(s) 129 is/are not exposed to the external environment, penetration paths of, for example mud, can be reduced to a minimum level, thereby resulting in improved waterproof as well as improved reliability.

Figure 12:
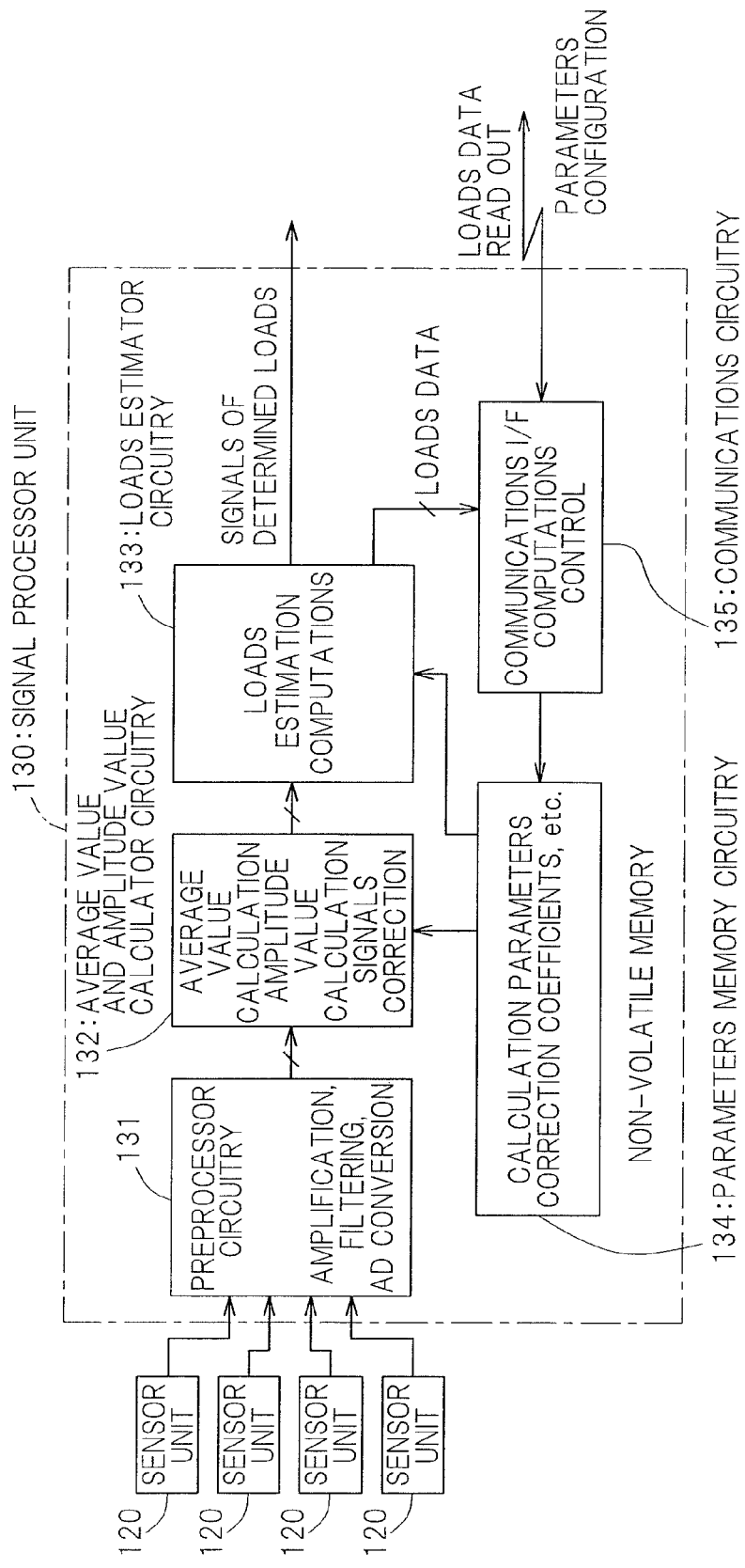
FIG. 12 shows a block diagram of a signal processor unit that processes sensor output signals from the sensor unit.

FIG. 12 shows a block diagram of a schematic configuration of the signal processor unit 130. The signal processor unit 130 includes preprocessor circuitry 131, average value and amplitude value calculator circuitry 132, loads estimator circuitry 133, parameters memory circuitry 134, and communications circuitry 135 that includes an I/F function. The preprocessor circuitry 131 includes a signal amplifier function to amplify sensor output signals from the respective sensor unit(s) 120, a filter function to remove noise components from the sensor output signals, and an AD converter function to convert the amplified and filtered sensor output signals from analog to digital. Since weak sensor output signals from the sensor unit(s) 120 are converted into digital signals by the sensor processor unit 130 arranged in proximity to the sensor unit(s) 120, the sensor output signals are less subject to noises, thereby resulting in improved sensing accuracy. The average value and amplitude value calculator circuitry 132 includes average value calculator function and amplitude value calculator function to calculate average value and amplitude value, which will be more described later, of the sensor output signals out of the preprocessor circuitry 131, and also includes a corrector function to correct, for example, the calculated average value. The loads estimator circuitry 133 includes loads estimator function to estimate loads acting on the drive wheel 70 based on the average value and amplitude value calculated by the average value and amplitude value calculator circuitry 132. Hence, the signal processor unit 130 performs all computations that are based on the sensor output signals from the sensor unit(s) 120. This results in improved usability. This also minimizes the number of external wires, thereby resulting in improved reliability.

Figure 13:
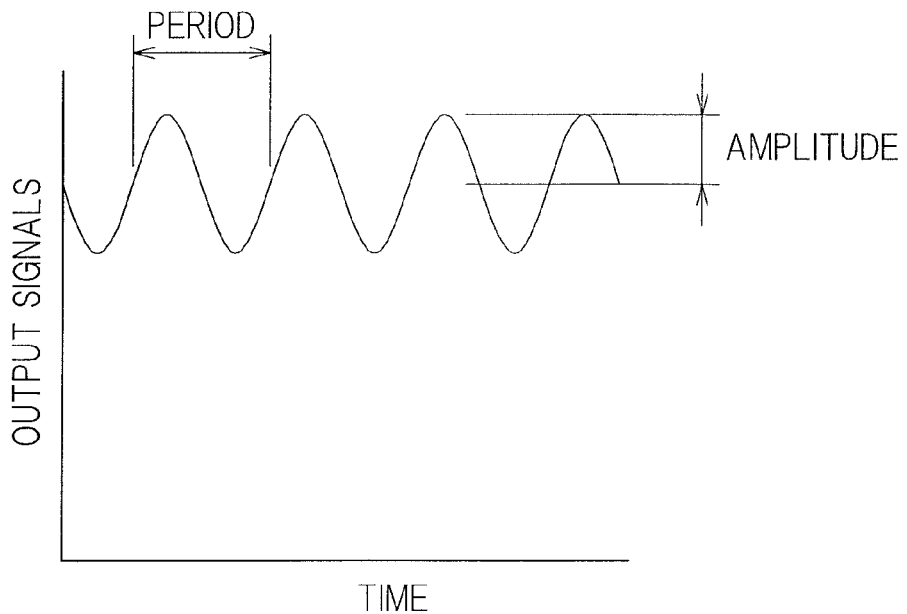
FIG. 13 illustrates a waveform of sensor output signals from the sensor unit.

Each of the sensor unit(s) 120 is associated with the outer ring 1 at an axial coordinate within the proximity of where an outboard raceway surface 3 of the outer ring 1 is located. As a result, the output signals from the respective strain sensor(s) 122 include influences from the rolling elements 5 that move in the proximity of where the respective sensor unit(s) 120 is/are disposed. Therefore, the amplitude of the sensor output signals reaches a maximum value thereof when the rolling elements 5 move in the closest proximity to the strain sensor 122 of the sensor unit 120, and the amplitude declines as the rolling elements 5 move away from that location. Accordingly, during the operation of the bearing assembly, the sensor output signals have a waveform similar to a sinusoidal wave such as shown in FIG. 13 whose amplitude changes in a period that corresponds to a pitch of the rolling elements 5. Here, the average value and amplitude value calculator circuitry 132 calculates an amplitude value (AC component) from the sensor output signals as well as an average value of the amplitude (DC component) of the sensor output signals, as data with which to determine loads.

The average value calculated by the average value and amplitude value calculator circuitry 132 includes temperature characteristics of the strain sensor(s) 122, temperature-dependent strain of the outer ring 1, and/or drift values generated by other factors. The average value and amplitude value calculator circuitry 132 is configured to correct drifts in the sensor output signals. The parameters memory circuitry 134 is configured to store correction parameters that can be read from the parameters memory circuitry 134 for correction of the drifts. The parameters memory circuitry 134 includes, for example, non-volatile memory. In order to correct temperature-dependent drifts, at least one sensor unit 120 may include a strain generator 121 that includes a temperature sensor 128 such as illustrated by an imaginary line in FIG. 7, and the output signals from the temperature sensor 128 may be input, along with the sensor output signals from the sensor unit(s) 120, via the preprocessor circuitry 131 to the average value and amplitude value calculator circuitry 132, for correction of the drifts. The parameters memory circuitry 134 may be configured to store information necessary with regard to the temperature sensor 128. The computing equations and/or correction parameters that the average value and amplitude value calculator circuitry 132 uses are configured based on the results obtained in advance from experiments and/or simulations.

Figure 14:
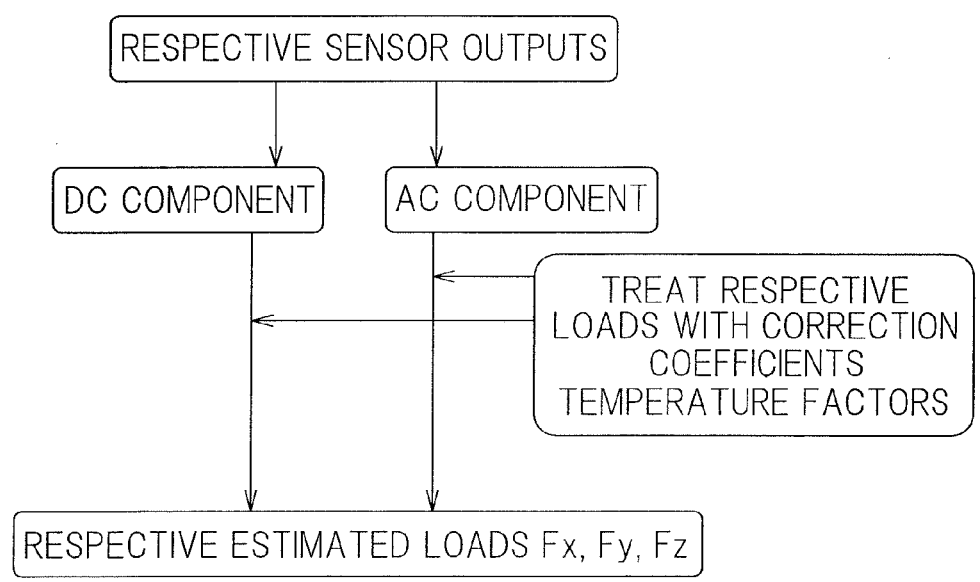
FIG. 14 shows a schematic view illustrating signal processing by a signal processor unit.

The loads estimator circuitry 133 is configured to estimate loads (a vertical load Fz, a load Fx representing a drive force and/or a brake force, and an axial load Fy) acting on the drive wheel 70 based on a linear equation where the average value and the amplitude value calculated by the average value and amplitude value calculator circuitry 132 serve as variables and where the variables are multiplied by respective defined correction coefficients. The parameters memory circuitry 134 is also configured to store the correction coefficients of the linear equation that can be read from the parameters memory circuitry 134. The correction coefficients are configured based on the results obtained in advance from experiments and/or simulations. The loads data obtained by the loads estimator circuitry 133 are transmitted via the communications circuitry 135 and output to a higher-order electric control unit (ECU) 85 (FIG. 15) at a vehicle body, through communication (for example, via CAN bus) with the electric control unit 85. If necessary, the loads data may be output in analog voltage. The respective parameters stored in the parameters memory circuitry 134 may be written from outside via the communications circuitry 135. FIG. 14 shows a schematic processing flow, starting from the sensor output signals from the sensor unit(s) 120 up until the estimation of the respective loads Fx, Fy, Fz by the loads estimator circuitry 133.

Loads acting between the drive wheel 70 and the road surface are also applied to the outer ring 1 which forms the stationary raceway member of the bearing unit A, resulting in deformation of the outer ring 1. Hence, the strain generator 121 of the sensor unit 120 includes the thin plate that includes two fixation contact segments 121a fixed in contact with the outer diameter surface of the outer ring 1. Thus, strain of the outer ring 1 is transmitted with ease to the strain generator 121 in the form of a larger strain thereof, which strain sensor 122 can sense with excellent accuracy.

In the embodiment under discussion, four sensor units 120 are associated with the outer ring 1 at the outer diameter surface having upper, lower, right and left surface portions that correspond upper and lower locations as well as right and left locations relative to the tire contact surface with the road, with each sensor being associated with the outer ring 1 at each of the upper, lower, right, and left surface portions such that the sensor circuits 120 are circumferentially spaced apart at equal intervals, 90° out of phase from each other. This allows for estimation with further precision of the loads that act on the bearing unit A, namely the vertical load Fz, the load Fx representing the drive force and/or the brake force, as well as the axial load Fy.

Figure 15:
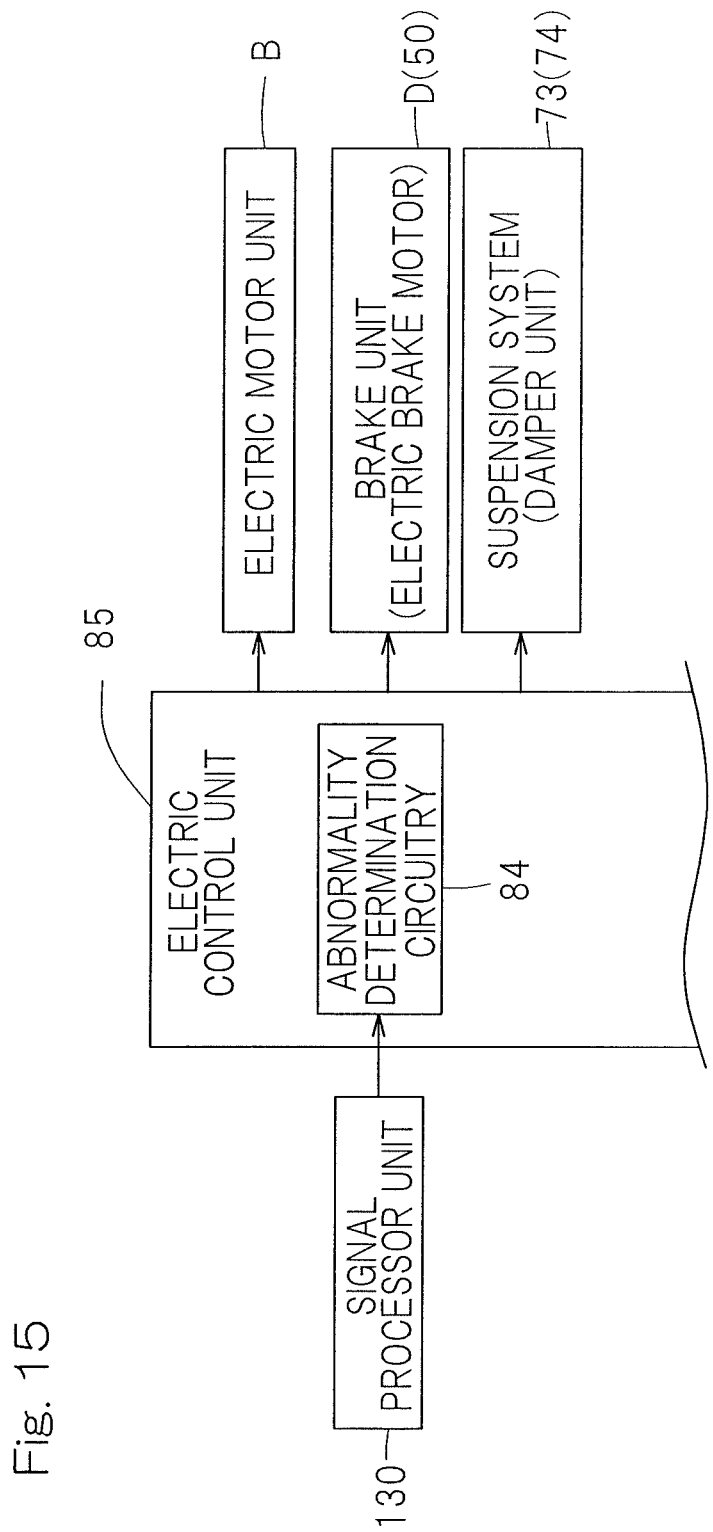
FIG. 15 shows a block diagram of a control system of the wheel support bearing assembly.
Figure 16:
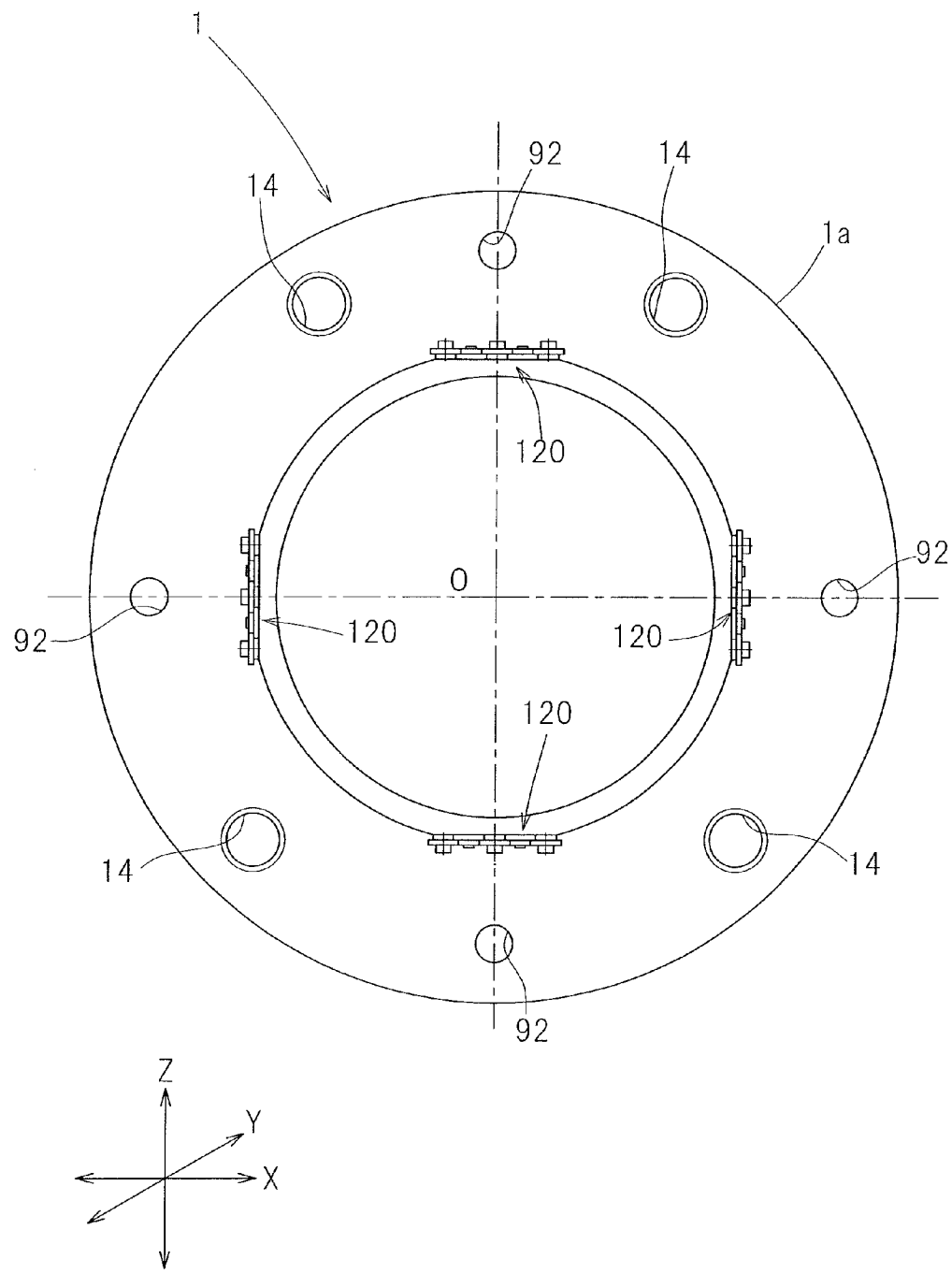
FIG. 16 shows a front elevational view of an outer member of a bearing unit of a wheel support bearing assembly with sensor and in-wheel motor integration according to the second embodiment of the invention, as viewed from an outboard side.

As shown in FIG. 15, the electric control unit 85 to which the loads data are input includes abnormality determination circuitry 84 that determines, based on the loads data, possible abnormalities of the road surface conditions and/or of the contact conditions between the drive wheel 70 and the road surface. Connected to the output of the electric control unit 85 are the electric motor unit B, the electric motor 50 of the brake unit D, and a damper unit 74 of the suspension system 73. The electric control unit 85 outputs, based on the loads data from the signal processor unit 130, information related to the road surface conditions and/or to the contact conditions between the drive wheel 70 and the road surface, to the electric motor unit B, the electric motor 50 of the brake unit D, and the damper unit 74 of the suspension system 73.

The configuration of the electric control unit 85 to output, based on the loads data from the signal processor unit 130, information related to the road surface conditions and/or to the contact conditions between the drive wheel 70 and the road surface allows for more precise estimation of road surface conditions and/or of contact conditions with the road. The resultant respective information can be used for control of the electric motor unit B and/or for vehicle attitude control, thereby resulting in improved safety and cost-efficiency. For instance, for smooth cornering of a vehicle, such information is output to the electric motor unit B to control the rotational speed of the right and left drive wheels 70. To prevent the locking-up of the drive wheel 70 under braking, such information is output to the electric motor 50 of the brake unit D for braking control. To prevent excessive rolling of the vehicle body under cornering or prevent excessive pitching of the vehicle body under acceleration or braking, such information is output to the damper unit 74 of the suspension system 73 for suspension control. The abnormality determination circuitry 84 generates an abnormality signal when one or more of the forces along the respective three axes exceed the respective acceptable limit(s). The abnormality signal may also be used for vehicle control of an automotive vehicle. Moreover, real-time output concerning the forces that acts between the drive wheel 70 and the road surface can result in much finer attitude control.

In this way, the wheel support bearing assembly with sensor and in-wheel integration includes sensor unit(s) 120, each of which includes the strain generator 121 and one strain sensor 122 attached to the strain generator 121, with the sensor unit(s) 120 being associated with the outer ring 1 at an outer diameter thereof, wherein the outer ring 1 forms the stationary raceway member of the bearing unit A. The strain generator 121 includes the thin plate that includes two fixation contact segments 121a fixed in contact with the outer diameter surface of the outer ring 1. This allows the sensor unit(s) 120 to sense with improved accuracy strain of the outer ring 1 of the bearing unit A, that is caused by forces acting on the contact point between the drive wheel 70 and the road surface. Therefore, a plurality of sensor output signals from the sensor unit(s) 120 can be used to computationally estimate with precision the loads Fx, Fy, Fz along three axes that act on the contact point between the drive wheel 70 and the road surface, that are effective for precise control of the electric motor unit B and/or the vehicle.

Also, in the embodiment under discussion, the signal processor unit 130 is associated with the casing 33 of the reduction gear unit C—i.e. associated with the stationary member other than the outer ring 1, with the signal processor unit 130 including the loads estimator circuitry 133 that estimates loads acting on the drive wheel 70 based on sensor output signals from the sensor unit(s) 120. In this construction, the wheel support bearing assembly includes the signal processor unit 130 with which sensor output signals from the sensor unit 120 are processed to generate loads data for external output. This eliminates the need to transmit weak sensor output signals via signal cable(s) 129 to the outside of the wheel support bearing assembly, thereby allowing for a simplified configuration of an electromagnetic shield for such signal cable(s) 129.

Also, in the embodiment under discussion, the signal processor unit 130 includes: the signal amplifier function to amplify the sensor output signals; the filter function to remove noise components from the sensor output signals; and the AD converter function to convert the sensor output signals from analog to digital. In this configuration, the sensor output signals from the sensor unit 120 are converted to digital signals for load estimation and the loads data are computed and output in the form of digital data. This minimizes the number of necessary wires, thereby reducing the cost of signal cable(s) 129 employed. At the same time, the risk of breaking of wire can be reduced, thereby resulting in improved reliability.

Moreover, the signal processor unit 130 further includes the processor function that includes: the corrector function to correct the sensor output signals; the average value calculator function to calculate the average value of the sensor output signals; the amplitude value calculator function to calculate the amplitude value of the sensor output signals; and the memory function to store correction parameters for the correction, calculation parameters for the average value calculation and the amplitude value calculation, and calculation parameters that the loads estimator circuitry 133 uses in computing equations where the average value and the amplitude value serve as variables. In particular, since such an amplitude value can minimize temperature-related effects, increase of load computing errors that may be caused by the heat generated by the electric motor unit B and/or the reduction gear unit C can be prevented, thereby improving the precision in load estimation. Also, with the signal processor unit 130 including such a processor function, different adjustments of correction parameters and calculation parameters for different wheel support bearing assemblies can be made with ease.

Also, in the embodiment under discussion, the motor controller unit 137 may be provided that controls the electric motor unit B, with the motor controller unit 137 including circuitry to which part of functions of the signal processor unit 130 is integrated. For example, such part of the functions performed by the circuitry includes one or more of the circuitries 131, 132, 133, 134, 135 described in connection with FIG. 12. In particular, it is preferred that the motor controller unit 137 include the parameters memory circuitry 134. In this configuration, for instance, the parameters memory circuitry 134 can be used to store therein the parameters necessary for total control of the electric motor unit B as well as the respective parameters used by the signal processor unit 130. This allows for centralized management of information necessary for the wheel support bearing assembly.

In the embodiment under discussion, the bearing unit A is a third-generation wheel support bearing unit whose inner member forms part of a hub. The bearing unit A may be a first-generation or second-generation wheel support bearing unit whose inner member and a hub of a wheel are separate components of each other. The bearing unit A may be a tapered rollers type wheel support bearing unit of any generation.

As shown in FIG. 5, the wheel support bearing assembly includes the brake unit D that includes the electric brake equipment which uses the electric motor 50 to moves the brake pad(s) 47. This prevents environmental contamination which may be caused by oil leakage that occurs in a hydraulic brake equipment. Such an electrically-powered brake allows for rapid adjustment of movement of the brake pad(s) 47, thereby resulting in improved response in control of the rotational speeds of the left and right drive wheels 70 under cornering.

Also, the wheel support bearing assembly electrically actuates the damper unit 74 of the suspension system 73, thereby resulting in improved response in suspension control and also resulting in more stable vehicle attitude.

In the above description, the signal processor unit 130 is configured to estimate the forces acting along three axes between the drive wheel 70 and the road surface, for output which is used to control the driving of the electric motor unit B, and/or the actuation of the brake unit D, and/or the actuation of the suspension system 73. It is more preferred that signals from a steering apparatus be also used for these respective controls, to achieve further adequate control for an actual travel. Furthermore, the wheel support bearing assembly of the invention may be applied to all wheels of the automotive vehicle or may only be applied to one or some of the wheels (i.e. not all of the wheels).

Figure 17:
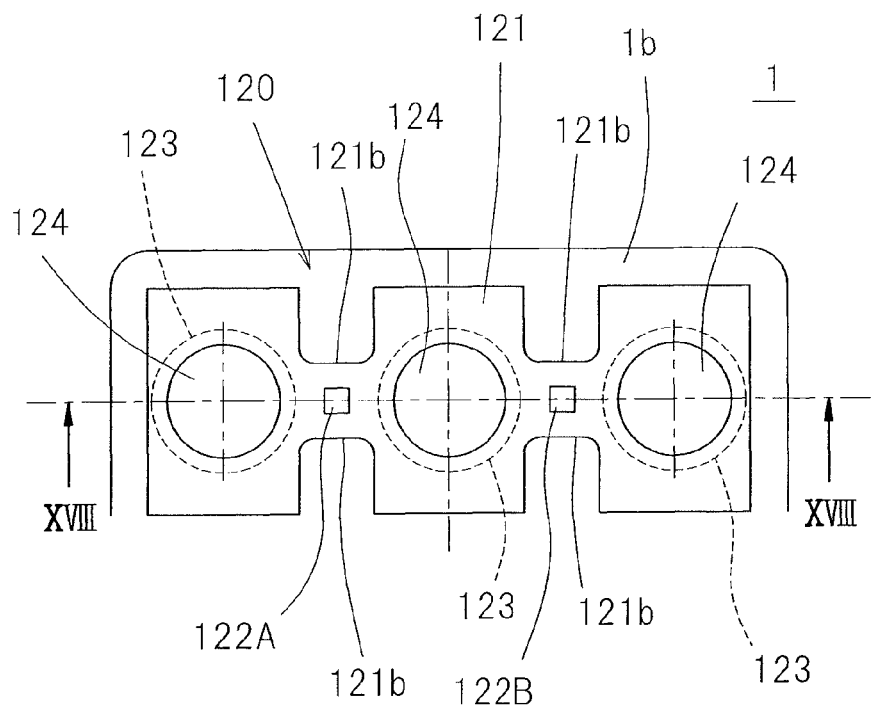
FIG. 17 shows an enlarged plan view of a sensor unit of the wheel support bearing assembly.
Figure 18:
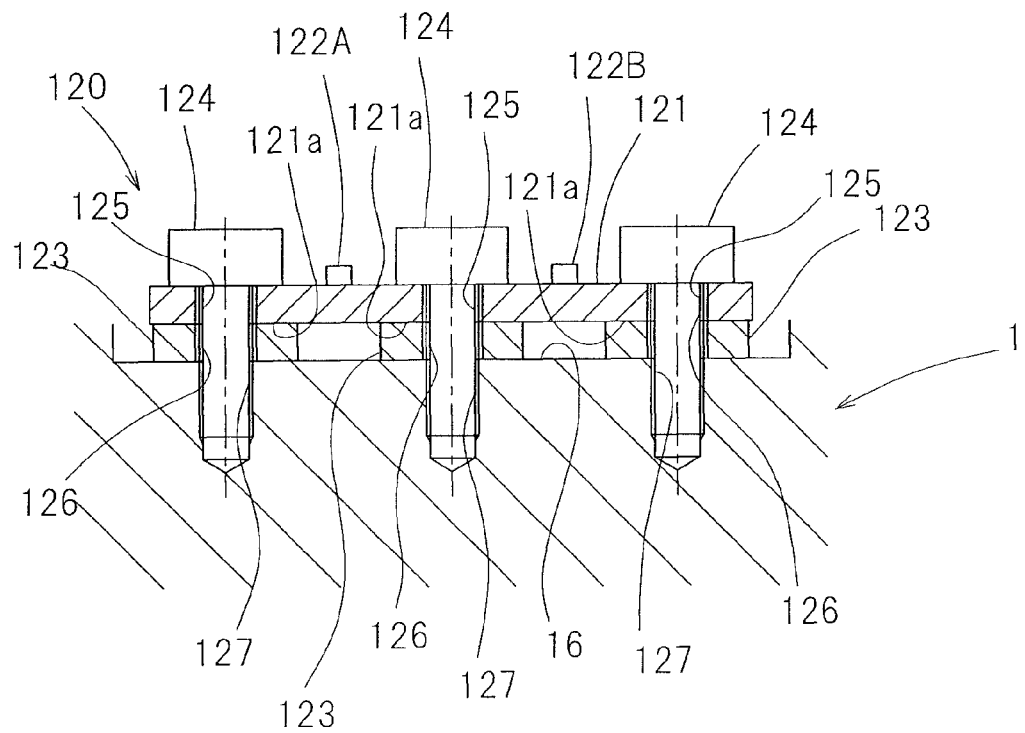
FIG. 18 shows a cross sectional view taken along the line XVIII-XVIII in FIG. 17.

FIG. 16 to FIG. 20 shows the second embodiment of the invention. In this embodiment, the wheel support bearing assembly with sensor and in-wheel motor integration according to the first embodiment as shown in FIG. 1 to FIG. 15 is modified to include sensor unit(s) 120 with the following configuration. As shown in the enlarged plan view of FIG. 17 and the enlarged cross sectional view of FIG. 18, each of the sensor unit(s) 120 includes a strain generator 121 and two strain sensors 122 attached to the strain generator 121 to sense strain of the strain generator 120. The strain generator 121 includes three fixation contact segments 121a fixed, via respective spacers 123, in contact with the outer diameter surface of the outer ring 1. The three fixation contact segments 121a are arranged in a line that extends in a longitudinal direction of the strain generator 121. In FIG. 18, a strain sensor 122A of the two strain sensors 122 is located between the fixation contact segment 121a on a left end of the strain generator 121 and the fixation contact segment 121a on a center of the strain generator 121, whereas the other strain sensor 122B of the two strain sensors 122 is located between the fixation contact segment 121a on a center of the strain generator 121 and the fixation contact segment 121a on a right end of the strain generator 121. As shown in FIG. 17, the strain generator 121 includes respective cutout(s) 121b formed in opposite side edges at two locations where the respective strain sensors 122A, 122B are associated with the strain generator 121.

Each of the sensor unit(s) 120 is associated with the outer ring 1 such that the three fixation contact segments 121a of that strain generator 121 are positioned at substantially the same axial coordinate of the outer ring 1 and also circumferentially spaced apart from each other. The fixation contact segments 121a are fixed, via respective spacers 123, by respective bolts 124 in contact with the outer diameter surface of the outer ring 1.

Figure 19:
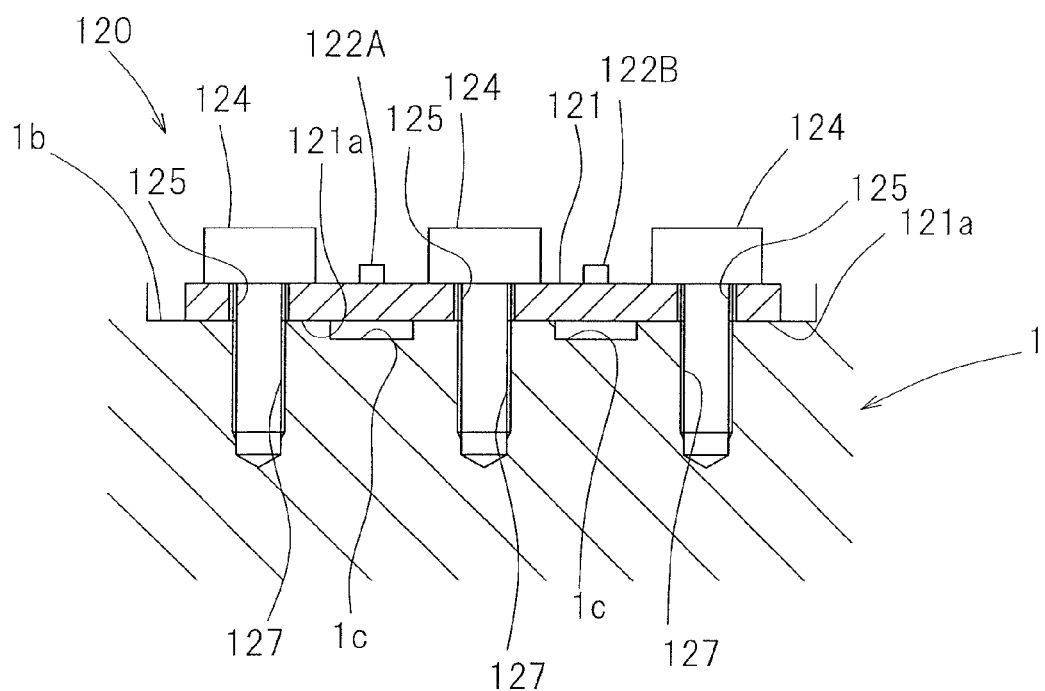
FIG. 19 shows a cross sectional view of another arrangement of the sensor unit.

In another example as shown in the cross sectional view of FIG. 19, the outer diameter surface of the outer ring 1 may have respective grooves 1c formed therein, at respective mid-locations between three portions of the outer diameter surface, with the three portions being where the three respective fixation contact segments 121a of the strain generator 121 are fixed. This also allows for a space to be formed, without the spacers 123, between the outer diameter surface of the outer ring 1 and where the cutout(s) 121b are formed in the strain generator 121. Other constructions and arrangements of the sensor unit(s) 120 are similar to those in the first embodiment shown in FIG. 1 to FIG. 15.

In the embodiment under discussion, the average value and amplitude value calculator circuitry 132 of the signal processor unit 130 in the first embodiment shown in FIG. 1 to FIG. 15 is modified to compute the sum of the output signals from the two strain sensors 122A, 122B for each of the sensor unit(s) 120, and to take out the sum as an average value. The difference of the output signals from the two strain sensors 122A, 122B is also computed and the differential value is taken out as an amplitude value.

Similarly to the previously discussed embodiment, each of the sensor unit(s) 120 is associated with the outer ring 1 at an axial coordinate within the proximity of where the outboard raceway surface 3 of the outer ring 1 is located. As a result, the output signals a, b from the respective strain sensor(s) 122A, 122B include influences from the rolling elements 5 that move in the proximity of where the respective sensor unit(s) 120 is/are disposed, as shown in (A) through (C) of FIG. 20. Note that, even when the wheel support bearing assembly is in rest, the output signals a, b from the respective strain sensor(s) 122A, 122B still include influences from the rest positions of the rolling elements 5. The sensor output signals a, b from the strain sensors 122A, 122B reach maximum values thereof when the rolling elements 5 move in the closest proximity to the respective strain sensors 122A, 122B of the sensor unit 120 (or when the rolling elements 5 are resting in such locations), and the sensor signals a, b decline as the rolling elements 5 move away from such locations (or when the rolling elements 5 are resting in locations away from such locations) as shown in (A) and (B) of FIG. 20. During the operation of the bearing assembly, the rolling elements 5, one after another with a defined pitch P, move past the proximity of where the respective sensor unit(s) 120 is/are disposed. Accordingly, the output signals a, b from the strain sensors 122A, 122B have a waveform similar to a sinusoidal wave such as the one illustrated by a solid line in (C) of FIG. 20 with cyclical changes in a period that corresponds to the pitch P of the rolling elements 5.

The output signals a, b from the strain sensors 122A, 122B include influences such as temperature-related influences. In the embodiment under discussion, the sum of the output signals a, b from the two strain sensors 122A, 122B is calculated to determine the aforementioned average value, and the difference in amplitude between the output signals a, b is calculated to determine the aforementioned amplitude value.

In this way, the fluctuation caused by the movement of the rolling elements is cancelled in the average value. Influences such as temperature-related influences that may appear in the respective output signals a, b from the two strain sensors 122A, 122B are cancelled in the amplitude value. Therefore, the use of the average value and the amplitude value allows for more precise estimation of loads that act on the bearing unit A and/or the tire contact surface with the road.

Figure 20:
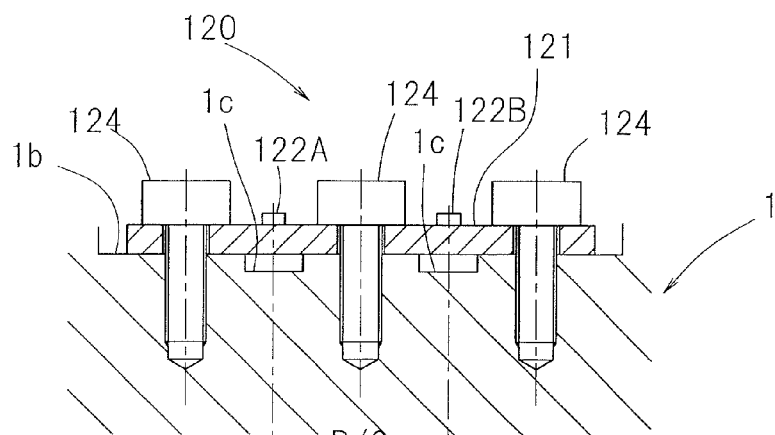
FIG. 20 illustrates the effects of the positions of rolling elements on output signals from a sensor unit.
Figure 20:
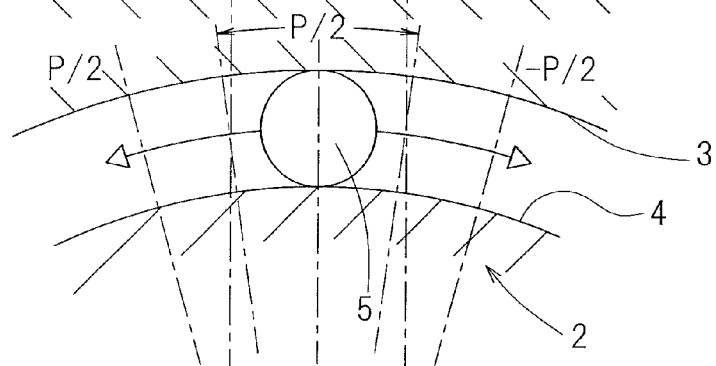
Figure 20:
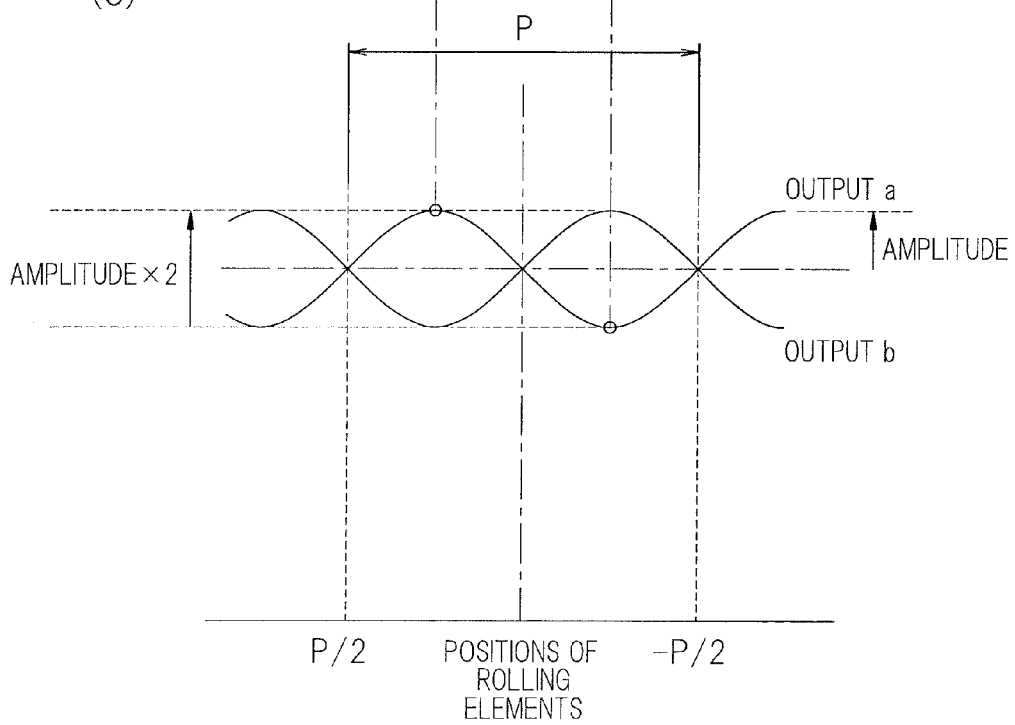

In (A) through (C) of FIG. 20, the arrangement of the three fixation contact segments 121a are such that they are arranged in a circumferential line and associated with the outer ring 1 at the outer diameter surface thereof, wherein the outer ring 1 forms the stationary raceway member. In the figure, the distance between the two fixation contact segments 121a on the opposite sides of the arrangement equals the pitch P of the rolling elements 5. As a result, the circumferential distance between the two strain sensors 122A, 122B that are located at respective mid-locations between the neighboring fixation contact segments 121a is substantially ½ of the pitch P of the rolling elements 5. Therefore, the output signals a, b from the two strain sensors 122A, 122B are substantially 180° out of phase from each other, and the fluctuation caused by the movement of the rolling elements 5 is cancelled in the average value that is determined as the sum of the output signals a, b. Influences such as temperature-related influences are cancelled in the amplitude value that is determined as the difference between the output signals a, b.

Note that in (A) through (C) of FIG. 20, by selecting the distance between the two fixation contact segments 121a on the opposite sides of the arrangement to be equal to the pitch P of the rolling elements 5 and by arranging the strain sensors 122A, 122B in the respective mid-locations between the neighboring fixation contact segments 121a, the circumferential distance between the two strain sensors 122A, 122B is indirectly made to be substantially ½ of the pitch P of the rolling elements 5. In another example, the circumferential distance between the two strain sensors 122A, 122B may directly be chosen to be substantially ½ of the pitch P of the rolling elements 5. Likewise, the circumferential distance between the two stain sensors 122A, 122B may directly be chosen to be ½+n of the pitch P of the rolling elements 5 with n being an integer, or to a value that is approximate to that value. In this case, too, the fluctuation caused by the movement of the rolling elements 5 is cancelled in the average value that is determined as the sum of the output signals a, b from the strain sensors 122A, 122B, and influences such as temperature-related influences are cancelled in the amplitude value that is determined as the difference between the output signals a, b.

Figure 21A:
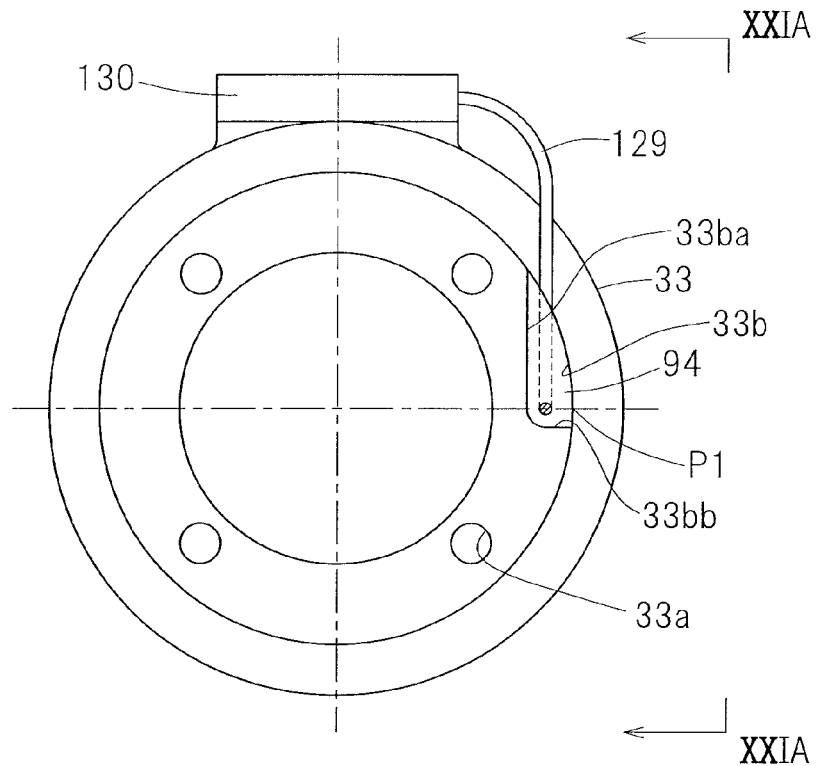
FIG. 21A shows a front elevational view of a casing of a reduction gear unit of a wheel support bearing assembly according to the third embodiment of the invention, as viewed from an outboard side.
Figure 21B:
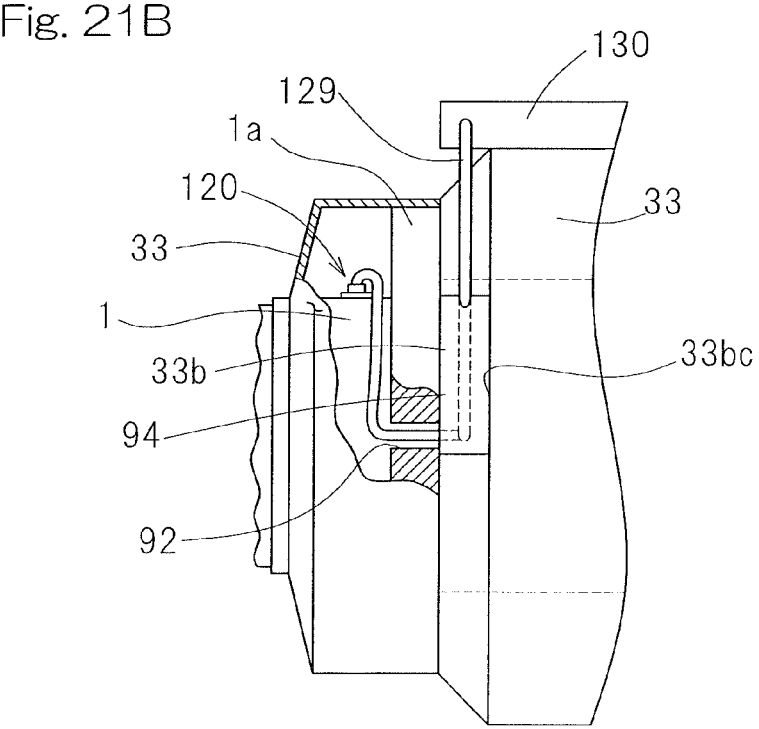
FIG. 21B shows a side view of a substantial portion from FIG. 21A.

FIG. 21A shows a front elevational view of a casing 33 of a reduction gear unit C according to the third embodiment of the invention, as viewed from an outboard side, and FIG. 21B shows a side view (end elevational view along the line XXIA-XXIA) of a substantial portion from FIG. 21A. As shown in FIG. 21A, the casing 33 of the reduction gear unit C includes an outboard end having cable guide cutout(s) 33b formed therein, with the cutout(s) 33b having a shape of a circumferentially extending groove—that is, the cutout(s) 33b including a circumferential groove. Signal cable(s) 129 drawn out of cable insertion hole(s) 92 of the flange 1a of the outer ring 1 pass through the cutout(s) 33b that have/has a shape of a groove, to connect to the signal processor unit 130.

The cutout(s) 33b of the casing 33 are located at location(s) out of phase from the signal processor unit 130. In the illustrated example, the cutout 33b is located at a location about 90° out of phase from the signal processor unit 130. From the casing 33, a material is cut out starting from a circumferential location P1 that confronts the cable insertion hole(s) 92 and removed along a direction substantially parallel to a tangential direction of the casing 33, to form a side surface 33ba of the groove of the cutout(s) 33b. From the casing 33, a material is cut out starting from the proximity of the location P1 and removed in a radial direction of the casing 33, to form an opposite side surface 33bb of the groove of the cutout(s) 33b. As shown in FIG. 21B, a material is also cut out to form a bottom surface 33bc of the groove of the cutout(s) 33b, such that the bottom surface 33bc extends in a plane perpendicular to an axial direction of the bearing assembly.

A waterproof seal 94 surrounds signal cable(s) 129 drawn out of the cable insertion hole(s) 92. The waterproof seal 94 fills the entire groove(s) of the cutout(s) 33b of the casing 33. Such signal cable(s) 129 passing through the cutout(s) 33b that have/has a shape of a groove and is/are formed in the casing 33 allows for sealing the signal cable(s) 129 over a longer length thereof than could be sealed when the signal cable(s) were radially drawn such as shown in FIG. 2. In other words, more improved sealing effect can be achieved between a surface of the signal cable(s) 129 and the waterproof seal 94. Also, the signal cable(s) 129 can have a greater bending radius that is the case with when the signal cable(s) 129 were radially drawn. Therefore, even signal cable(s) 129 with thick coatings can be wired with ease. Also, the radial sticking-out of signal cable(s) 129 can be minimized. Accordingly, the entire size of the sensor unit(s) can be reduced.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: OUTER RING
22: CASING OF ELECTRIC MOTOR UNIT
33: CASING OF REDUCTION GEAR UNIT
33b: CUTOUT (GROOVE)
70: DRIVE WHEEL
120: SENSOR UNIT
121: STRAIN GENERATOR
121a: FIXATION CONTACT SEGMENT
122, 122A, 122B: STRAIN SENSOR
130: SIGNAL PROCESSOR UNIT
133: LOADS ESTIMATOR CIRCUITRY
137: MOTOR CONTROLLER UNIT

What is claimed is:

1. A wheel support bearing assembly with sensor and in-wheel motor integration, the assembly comprising:
 a bearing unit that rotatably supports a hub of a drive wheel, the bearing unit including an outer ring forming a stationary raceway member, the outer ring having an outer diameter surface;
 an electric motor unit forming a drive source to rotate the drive wheel;
 a reduction gear unit interposed between the electric motor unit and the bearing unit; and
 a sensor unit including a strain generator and at least one measuring sensor attached to the strain generator, the sensor unit being associated with the outer ring, the strain generator including a thin plate including at least two fixation contact segments fixed in contact with the outer diameter surface of the outer ring,
wherein the sensor unit is associated with the outer ring at an outboard side of the outer diameter surface and the assembly further comprises a cover protecting the outboard side of the outer diameter surface.

2. The wheel support bearing assembly as claimed in claim 1, wherein the outer diameter surface of the outer ring has upper, lower, right and left surface portions that correspond to upper and lower locations as well as right and left locations relative to a tire contact surface with a road, and
the sensor unit is associated with the outer ring at each of the upper, lower, right, and left surface portions.

3. The wheel support bearing assembly as claimed in claim 1, wherein the sensor unit includes one sensor and two fixation contact segments.

4. The wheel support bearing assembly as claimed in claim 1, wherein the sensor unit includes two sensors and three fixation contact segments.

5. The wheel support bearing assembly as claimed in claim 1, further comprising a plastic molding, in proximity to where the sensor unit is disposed, that renders the sensor unit waterproof.

6. The wheel support bearing assembly as claimed in claim 1, further comprising a signal processor unit associated with the outer ring of the bearing unit, a casing of the reduction gear unit, or a casing of the electric motor unit, the signal processor unit including loads estimator circuitry that estimates loads acting on the drive wheel based on sensor output signals from the sensor unit.

7. A wheel support bearing assembly with sensor and in-wheel motor integration, the assembly comprising:
a bearing unit that rotatably supports a hub of a drive wheel, the bearing unit including an outer ring forming a stationary raceway member, the outer ring having an outer diameter surface;
an electric motor unit forming a drive source to rotate the drive wheel;
a reduction gear unit interposed between the electric motor unit and the bearing unit; and
a sensor unit including a strain generator and at least one measuring sensor attached to the strain generator, the sensor unit being associated with the outer ring, the strain generator including a thin plate including at least two fixation contact segments fixed in contact with the outer diameter surface of the outer ring; and
a signal processor unit associated with the outer ring of the bearing unit, a casing of the reduction gear unit, or a casing of the electric motor unit, the signal processor unit including loads estimator circuitry that estimates loads acting on the drive wheel based on sensor output signals from the sensor unit,
wherein the signal processor unit is associated with a stationary member other than the outer ring of the bearing unit, the outer ring of the bearing unit includes a flange for mounting the outer ring to the casing of the reduction gear unit, the flange has a hole formed therein, and a sensor cable is drawn out of the hole and wired to the signal processor unit for transmission of the output signals from the sensor unit to the signal processor unit.

8. The wheel support bearing assembly as claimed in claim 7, wherein the casing of the reduction gear unit has a groove formed therein through which the sensor cable passes.

9. A wheel support bearing assembly with sensor and in-wheel motor integration, the assembly comprising:
a bearing unit that rotatably supports a hub of a drive wheel, the bearing unit including an outer ring forming a stationary raceway member, the outer ring having an outer diameter surface;
an electric motor unit forming a drive source to rotate the drive wheel;
a reduction gear unit interposed between the electric motor unit and the bearing unit; and
a sensor unit including a strain generator and at least one measuring sensor attached to the strain generator, the sensor unit being associated with the outer ring, the strain generator including a thin plate including at least two fixation contact segments fixed in contact with the outer diameter surface of the outer ring; and
a signal processor unit associated with the outer ring of the bearing unit, a casing of the reduction gear unit, or a casing of the electric motor unit, the signal processor unit including loads estimator circuitry that estimates loads acting on the drive wheel based on sensor output signals from the sensor unit,
wherein the signal processor unit at least includes;
a signal amplifier function to amplify the sensor output signals;
a filter function to remove noise components from the sensor output signals; and
an AD converter function to convert the sensor output signals from analog to digital.

10. The wheel support bearing assembly as claimed in claim 9, wherein the signal processor unit further includes a processor function that includes:
a corrector function to correct the sensor output signals;
an average value calculator function to calculate an average value of the sensor output signals;
an amplitude value calculator function to calculate an amplitude value of the sensor output signals; and
a memory function to store correction parameters for the correction, calculation parameters for the average value calculation and the amplitude value calculation, and calculation parameters that the loads estimator circuitry uses in computing equations where the average value and the amplitude value serve as variables.

11. A wheel support bearing assembly with sensor and in-wheel motor integration, the assembly comprising:
a bearing unit that rotatably supports a hub of a drive wheel, the bearing unit including an outer ring forming a stationary raceway member, the outer ring having an outer diameter surface;
an electric motor unit forming a drive source to rotate the drive wheel;
a reduction gear unit interposed between the electric motor unit and the bearing unit; and
a sensor unit including a strain generator and at least one measuring sensor attached to the strain generator, the sensor unit being associated with the outer ring, the strain generator including a thin plate including at least two fixation contact segments fixed in contact with the outer diameter surface of the outer ring;
a signal processor unit associated with the outer ring of the bearing unit, a casing of the reduction gear unit, or a casing of the electric motor unit, the signal processor unit including loads estimator circuitry that estimates loads acting on the drive wheel based on sensor output signals from the sensor unit; and
a motor controller unit that controls the electric motor unit, the motor controller unit including circuitry to which part of functions of the signal processor unit is integrated.

* * * * *

UNITED STATES PATENT AND TRADEMARK OFFICE
CERTIFICATE OF CORRECTION

PATENT NO.        : 8,581,457 B2             Page 1 of 1
APPLICATION NO.   : 13/480915
DATED             : November 12, 2013
INVENTOR(S)       : Toru Takahashi et al.

It is certified that error appears in the above-identified patent and that said Letters Patent is hereby corrected as shown below:

In the Claims

In Column 20, Line 20, In Claim 9, delete "includes;" and insert -- includes --, therefor.

Signed and Sealed this
Eleventh Day of February, 2014

Michelle K. Lee
*Deputy Director of the United States Patent and Trademark Office*